(12) United States Patent
Kitayama et al.

(10) Patent No.: US 9,279,462 B2
(45) Date of Patent: Mar. 8, 2016

(54) ROTATION TRANSMISSION DEVICE

(71) Applicants: Naotsugu Kitayama, Shizuoka (JP); Takahide Saito, Shizuoka (JP); Koji Akiyoshi, Shizuoka (JP); Koji Sato, Shizuoka (JP)

(72) Inventors: Naotsugu Kitayama, Shizuoka (JP); Takahide Saito, Shizuoka (JP); Koji Akiyoshi, Shizuoka (JP); Koji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/385,782

(22) PCT Filed: Mar. 12, 2013

(86) PCT No.: PCT/JP2013/056755
§ 371 (c)(1),
(2) Date: Sep. 17, 2014

(87) PCT Pub. No.: WO2013/146226
PCT Pub. Date: Oct. 3, 2013

(65) Prior Publication Data
US 2015/0075935 A1    Mar. 19, 2015

(30) Foreign Application Priority Data

Mar. 26, 2012 (JP) ................. 2012-069032
Mar. 29, 2012 (JP) ................. 2012-076345
Jun. 13, 2012 (JP) ................. 2012-133730
Jun. 28, 2012 (JP) ................. 2012-145207
Jul. 25, 2012 (JP) ................. 2012-164573

(51) Int. Cl.
*F16D 47/04* (2006.01)
*F16D 27/112* (2006.01)
*F16D 41/08* (2006.01)
*F16D 27/118* (2006.01)

(52) U.S. Cl.
CPC ............ *F16D 41/086* (2013.01); *F16D 27/112* (2013.01); *F16D 27/118* (2013.01); *F16D 41/088* (2013.01); *F16D 47/04* (2013.01)

(58) Field of Classification Search
CPC ...... F16D 41/086; F16D 27/118; F16D 47/04; F16D 41/088; F16D 27/112
See application file for complete search history.

(56) References Cited

U.S. PATENT DOCUMENTS

| 4,030,581 A * | 6/1977 | Giometti ........................ 192/16 |
| 2003/0062690 A1 * | 4/2003 | Yasui et al. ................... 277/549 |
| 2010/0314212 A1 | 12/2010 | Akiyoshi et al. |
| 2011/0061983 A1 | 3/2011 | Sato et al. |

FOREIGN PATENT DOCUMENTS

| JP | 2005-140145 | 6/2005 |
| JP | 2005-155834 | 6/2005 |
| JP | 2006-052838 | 2/2006 |
| JP | 2009-144771 | 7/2009 |
| JP | 2009-287724 | 12/2009 |
| JP | 2009-293759 | 12/2009 |

OTHER PUBLICATIONS

International Search Report issued Apr. 23, 2013 in International (PCT) Application No. PCT/JP2013/056755.
Japanese Office Action issued Oct. 27, 2015 in Japanese Application No. 2012-069032 (with partial English translation).

* cited by examiner

*Primary Examiner* — Colby M Hansen
(74) *Attorney, Agent, or Firm* — Wenderoth, Lind & Ponack, L.L.P.

(57) ABSTRACT

A rotation transmission device includes a control retainer and a rotary retainer having bars arranged circumferentially alternating with each other such that pockets are defined between the adjacent pairs of bars. A pair of rollers are mounted in each pocket with an elastic member disposed between the pair of rollers such that the pair of rollers are pushed by the respective bars to their respective disengaged positions when the control retainer and the rotary retainer rotate relative to each other. A spring holder is fitted on an input shaft while abutting one axial end surface of an inner ring. The spring holder has spring support pieces on the outer periphery thereof to prevent radially outward movement of the elastic members. The spring support pieces are plate-shaped members disposed radially outwardly of the elastic members to extend in the axial direction in parallel to the outer periphery of the inner ring.

15 Claims, 18 Drawing Sheets

Fig. 12
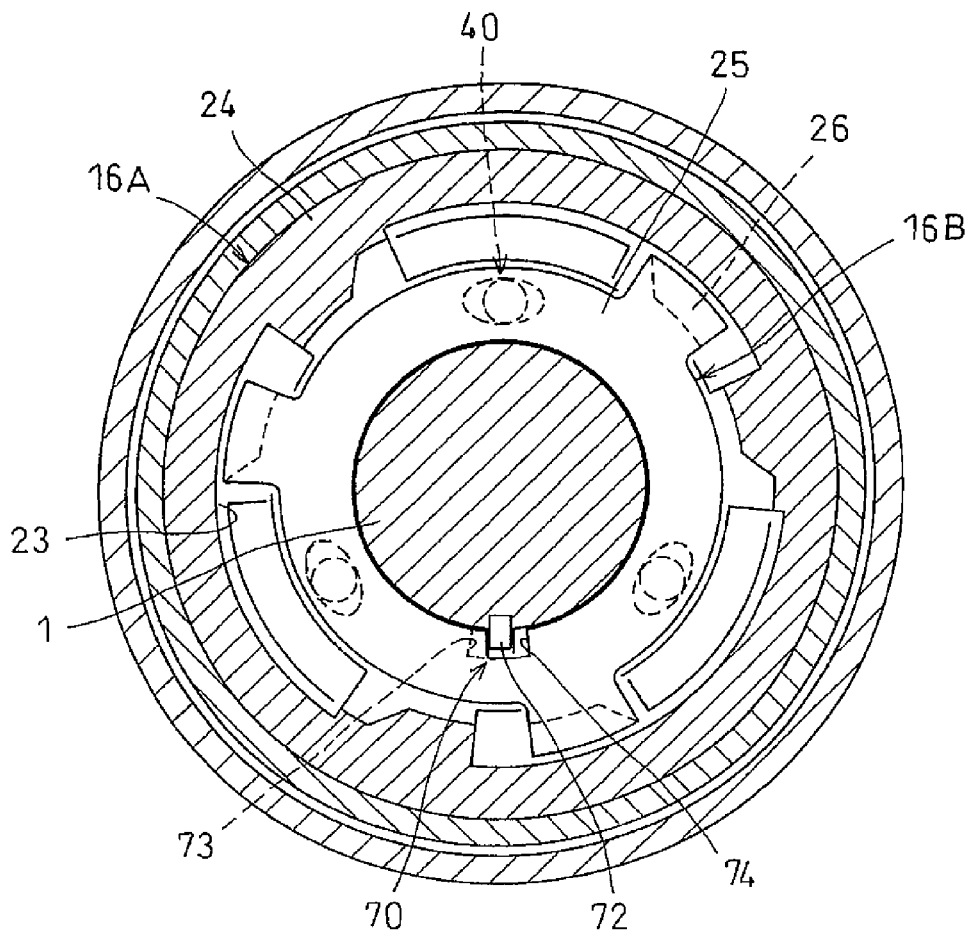
Fig. 13(a)   Fig. 13(b)
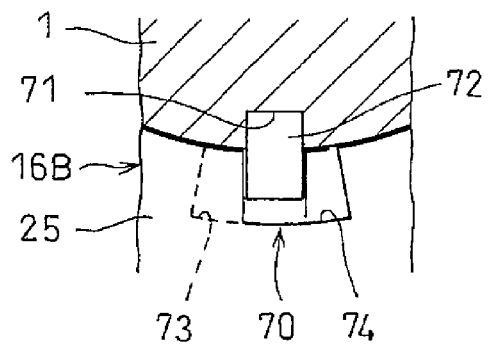 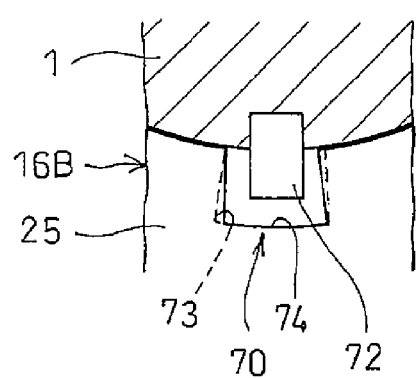

ROTATION TRANSMISSION DEVICE

TECHNICAL FIELD

This invention relates to a rotation transmission device which can selectively transmit rotation of one member to another member.

BACKGROUND ART

One known rotation transmission device which can selectively transmit rotation of a driving shaft to a driven shaft includes a two-way clutch and an electromagnetic clutch for selectively engaging and disengaging the two-way clutch.

The rotation transmission device disclosed in JP Patent Publication 2009-287724A includes an outer ring, an inner ring mounted inside the outer ring, and a control retainer and a rotary retainer each having bars mounted between the inner and outer rings such that the bars of the control retainer are arranged circumferentially alternating with the bars of the rotary retainer, whereby pockets are defined between circumferentially adjacent pairs of the bars of the respective retainers. The rotation transmission device further includes opposed pairs of rollers, each pair being mounted in one of the pockets, and elastic members mounted between the respective opposed pairs of rollers and biasing the respective opposed pairs of rollers away from each other toward standby positions where the rollers can instantly engage a cylindrical surface formed on the inner periphery of the outer ring and cam surfaces formed on the outer periphery of the inner ring, whereby when the inner ring rotates in either direction, one of each opposed pair of rollers engages the cylindrical surface and the cam surface, thereby transmitting rotation of the inner ring to the outer ring.

The rotation transmission device further includes an electromagnetic clutch mounted on an input shaft, which carries the inner ring. The electromagnetic clutch is configured to move the control retainer in the axial direction when the electromagnet of the electromagnetic clutch is energized. When the control retainer is moved in the axial direction by the electromagnetic clutch, the retainers are rotated relative to each other in the direction in which the circumferential widths of the pockets decrease due to the action of a torque cam provided between the opposed surfaces of a flange of the control retainer and a flange of the rotary retainer, whereby the pairs of rollers are moved by the bars of the respective retainers to the disengaged position, thus preventing transmission of rotation from the inner ring to the outer ring.

This rotation transmission device is further configured such that when the control retainer is moved by the electromagnetic clutch in the direction in which the flange of the control retainer moves away from the flange of the rotary retainer, the rotary retainer and the control retainer are rotated relative to each other under the biasing of the elastic members mounted between the respective opposed pairs of rollers, in the direction in which the circumferential widths of the pockets increase, thus allowing the rollers to instantly engage the cylindrical surface and the cam surfaces. Thus, when the rollers engage, the rollers move very little in the circumferential direction, so that the response of the clutch is good.

This rotation transmission device includes a spring holder rotationally fixed to the input shaft and kept in abutment with one end of the inner ring. The spring holder includes braking pieces (protruding pieces) on its inner periphery, with each braking piece having a spring support piece on its outer periphery which prevents radially outward movement of the corresponding elastic member. This arrangement stabilizes the positions of the respective rollers pressed by the elastic members, thus making it possible to reliably press the rollers toward the engaged positions. This in turn ensures reliable operation of the two-way clutch.

In the rotation transmission device disclosed in JP Patent Publication 2009-287724A, each spring support piece is formed with a through hole extending between both side surfaces thereof, and the elastic members, which are coil springs, are inserted in the respective through holes to prevent radial movements of the elastic members. With this arrangement, since the elastic members have to be inserted into the through holes in a direction perpendicular to the length direction of the bars, the bars tend to interfere with the elastic members when inserting the elastic members into the through holes. Thus, in order to avoid interference with the bars, the elastic members have to be inserted into the through holes while being bent in the length direction of the elastic members. It is therefore difficult to mount the elastic members in position, and it has been desired to more easily mount the elastic members in position.

This spring holder is rotationally fixed in position by the engagement between an engaging surface formed on the inner periphery of the spring holder and an engaging surface formed on the input shaft and opposed to the engaging surface of the spring holder. Thus, the spring holder keeps the control retainer and the rotary retainer in their respective neutral positions upon abutment of the bars of the two retainers against the side edges of the protruding pieces. However, since the bars of the two retainers tend to collide hard against the protruding pieces when the former abut the latter, and since there tends to be a slight time difference between when the bars of one retainer abut the protruding pieces and when the bars of the other retainer abut the protruding pieces, the (flat) engaging surface of the spring holder and the engaging surface of the input shaft, which are in engagement with each other to rotationally fix the spring holder, tend to be deformed or become damaged. Deformation of or damage to the spring holder could detrimentally influence the operation of the two-way clutch.

If the flat surface and/or the engaging surface is deformed, the spring holder may be moved axially due to looseness between the flat surface and the engaging surface. If the control retainer is inclined with the spring holder displaced axially, the edge on the inner periphery of the spring holder could engage the outer periphery of the input shaft and the spring holder could get locked to the input shaft. If the electromagnetic clutch is de-energized in this state, the spring holder interferes with the movement of the control retainer, making it impossible to move the control retainer to the predetermined engaged position. This makes it impossible to timely engage the two-way clutch. Thus, it is desired to reliably and accurately engage the two-way clutch of this conventional rotation transmission device.

In the rotation transmission device disclosed in JP Patent Publication 2009-287724A, while not shown, the two-way clutch and the electromagnetic clutch are entirely covered by a housing. Ordinarily in such an arrangement, a lead wire is connected to the electromagnetic coil of the electromagnet forming the electromagnetic clutch so as to extend to the outside of the rotation transmission device, and a male connector is connected to the distal end of the lead wire to which a female connector connected to the end of the power cord can be detachably connected.

In this arrangement, since the lead wire is exposed to the outside, when the rotation transmission device is mounted on an external device, the lead wire may get caught on an external part and be broken. The lead wire thus makes handling of the rotation transmission device difficult. It is desired to make handling of this rotation transmission device easier.

SUMMARY OF THE INVENTION

An object of the present invention is, in a rotation transmission device of the above-described type, in which the two-way clutch is selectively engaged and disengaged by the electromagnetic clutch, to make it easier to mount the elastic members for biasing the respective opposed pairs of rollers away from each other.

In order to achieve this object, the present invention provides a rotation transmission device comprising an input shaft, an output shaft arranged coaxial with the input shaft, a housing covering end portions of the input shaft and the output shaft, a two-way clutch mounted in the housing and configured to selectively transmit torque from the input shaft to the output shaft, and an electromagnetic clutch configured to selectively engage and disengage the two-way roller clutch, wherein the two-way clutch comprises an outer ring provided at the end portion of the output shaft and having an inner periphery, an inner ring provided at the end portion of the input shaft and having an outer periphery, a control retainer including a plurality of circumferentially spaced apart first bars, a rotary retainer including a plurality of circumferentially spaced apart second bars, wherein the first and second bars are disposed between the inner periphery of the outer ring and the outer periphery of the inner ring, with the first bars disposed between respective circumferentially adjacent pairs of second bars, thereby defining pockets between the respective first bars and the second bars circumferentially adjacent to the respective first bars, a plurality of opposed pairs of engaging elements, each opposed pair of the engaging elements being mounted in one of the pockets, and elastic members mounted between the respective opposed pairs of engaging elements and biasing the opposed pairs of engaging elements toward positions where the engaging elements engage the inner periphery of the outer ring and the outer periphery of the inner ring, wherein the inner ring has a first end surface and a second end surface, wherein the first end surface is located closer to an opening of the outer ring than is the second end surface, wherein the rotation transmission device further comprises an annular spring holder kept in abutment with the first end surface of the inner ring so as to rotate together with the input shaft, the spring holder including spring support pieces provided on the outer periphery of the spring holder and configured to prevent radially outward movement of the respective elastic members, wherein the electromagnetic clutch comprises an armature connected to the control retainer and movable in an axial direction of the input shaft, and an electromagnet including an electromagnetic coil supported by a yoke, wherein the electromagnetic clutch is configured to move the control retainer in the axial direction through the armature when the electromagnet is energized, thereby rotating the control retainer and the rotary retainer relative to each other in a direction in which circumferential widths of the pockets decrease, and disengaging the engaging elements, wherein the spring support pieces are plate-shaped members disposed radially outwardly of the respective elastic members to extend in the axial direction in parallel to the outer periphery of the input shaft, and wherein gaps are defined between the distal ends of the spring support pieces and the outer periphery of the input shaft such that the elastic members can be inserted through the gaps.

Since the spring support pieces of the spring holder are plate-shaped members disposed radially outwardly of the respective elastic members to extend in the axial direction in parallel to the outer periphery of the input shaft, gaps are defined between the distal ends of the spring support pieces and the outer periphery of the input shaft, so that the elastic members can be inserted through these gaps.

In the rotation transmission device according to the present invention, each of the spring support pieces may have tapered surfaces formed along intersections between the inner surface and the respective circumferential side surfaces thereof. This prevents the elastic members from getting caught on edges of the spring support pieces when the elastic members are compressed, thus making smooth compression of the elastic members difficult. The elastic members can thus be compressed smoothly.

If the spring holder is formed by pressing, such a spring holder can be manufactured easily and thus at a low cost.

A washer may be fitted on the input shaft so as to abut the other end surface of the inner ring, to prevent movement of the rollers toward the other end surface of the inner ring. This in turn prevents separation of the rollers from the pockets. The washer preferably has an outer diameter larger than the diameter of the circle passing through the centers of the elastic members so that the washer prevents not only separation of the rollers but also separation of the elastic members.

By using coil springs having elliptical cross-sections as the elastic members, each roller can be pressed by the elastic member at two points symmetrical to each other with respect to the longitudinal center of the roller. This prevents skewing of the rollers.

Preferably, the two-way clutch further includes a rotation angle restricting means disposed between the input shaft and the control retainer and the rotary retainer and configured to restrict rotation of the control retainer and the rotary retainer relative to the input shaft beyond a neutral position in which the rollers are not in engagement with the inner ring and the outer ring, in directions in which the control retainer and the rotary retainer are rotated to the neutral position, respectively. The rotation angle restricting means prevents the impact when the control retainer and the rotary retainer are brought into the neutral position from being transmitted to the spring holder, thus preventing the spring holder from becoming loose and inclining, thereby interfering with the axial movement of the control retainer. This in turn makes it possible to engage the two-way clutch with high accuracy.

The rotation angle restricting means may comprise a protrusion formed on the outer periphery of the input shaft, and cutouts formed in inner peripheries of the respective flanges of the control retainer and the rotary retainer, wherein the protrusion is fitted in the respective cutouts with circumferential play left between the protrusion and the respective cutouts. The protrusion may be a key, which is typically used to rotationally fix a rotary member.

In the rotation transmission device according to the present invention, by forming the rotary retainer by pressing, it is possible to reduce the cost of the rotation transmission device.

In one arrangement, the rotary retainer comprises a flange formed by pressing and having protruding pieces formed on the outer periphery of the flange of the rotary retainer, the protruding pieces being equal in number to the second bars, and the second bars are formed by pressing separately from the flange of the rotary retainer, and fixedly joined to the protruding pieces. Such a rotary retainer can be manufactured easily.

The second bars may be joined to the flange by welding, diffusion bonding or adhesive bonding.

In another arrangement, the control retainer includes a retainer body comprising an annular flange having an outer peripheral portion at which the first bars are provided, and further comprises a tubular member provided on the outer periphery of the retainer body and connected to the armature, the retainer body and the tubular member are separate members from each other with the tubular body formed by pressing, and the retainer body is fitted in and fixedly joined to the tubular member. With this arrangement, it is possible to further reduce the cost of the rotation transmission device.

By providing the electromagnet with a male connector which can be detachably connected to a female connector provided at the end of a power cord, it is possible to omit a lead wire. By omitting a lead wire, which could get caught on other parts and thus interfere with the rotation transmission device when the latter is mounted in position, handling of the rotation transmission device is easy.

Preferably, the male connector is formed with an engaged portion in which an engaging portion provided on the female connector is configured to be snap-fitted. With this arrangement, the female connector can be reliably connected to the male connector.

By covering electromagnetic coil entirely by a coil cover, and forming the male connector by molding simultaneously when the coil cover is formed by molding, the male connector can be formed easily.

In a preferred embodiment, the housing has at one end thereof a bearing tube covering the output shaft and having an open end, and the rotation transmission device further comprises a bearing mounted in the bearing tube and rotatably supporting the output shaft, a backup plate mounted between the bearing and the open end of the bearing tube, an elastic member mounted between the backup plate and the bearing and biasing the housing and internal components mounted in the housing in opposite directions to each other, thereby preventing axial movements of the internal components relative to each other and to the housing, with the elastic member compressed in the axial direction and with the electromagnet prevented from being pulled out of the housing, and a guide ring capable of retaining the elastic member coaxial with the housing if the elastic member were mounted in the bearing tube in a natural state in which the elastic member is not compressed in the axial direction.

In this arrangement, the elastic member biases the housing and the internal components mounted in the housing in opposite directions to each other, thus preventing axial movements of the internal components relative to each other and relative to the housing. This eliminates the necessity to mount a shim to prevent axial movements of the internal components, which makes it easier to assemble the rotation transmission device and thus reduce its cost.

The guide ring mounted in the bearing tube supports the elastic member so as to be coaxial with the housing in the natural state of the elastic member, namely before the elastic member is axially compressed. The guide ring thus allows the elastic member to be radially expanded without its axis being displaced from the axis of the housing when the elastic member is elastically axially compressed while being radially expanded by moving the housing and the internal components relative to each other. This makes it possible to reliably prevent axial movements of the internal components.

According to the present invention, since the spring support pieces of the spring holder, which are configured to prevent radially outward movement of the elastic members, are plate-shaped members disposed radially outwardly of the respective elastic members to extend in the axial direction in parallel to the outer periphery of the input shaft, it is possible to insert the elastic members into the respective pockets through gaps defined between the distal ends of the spring support pieces and the outer periphery of the input shaft. The elastic members can thus be extremely easily mounted in position.

BRIEF DESCRIPTION OF THE DRAWINGS

FIG. 12 is a sectional view taken along line XII-XII of FIG. 11.
FIG. 13(a) is an enlarged sectional view of a portion of FIG. 12 where there is a rotation angle restricting mechanism;
and FIG. 13(b) is a similar sectional view showing the state in which retainer members are not restricted.

DETAILED DESCRIPTION OF THE INVENTION

Figure 1:
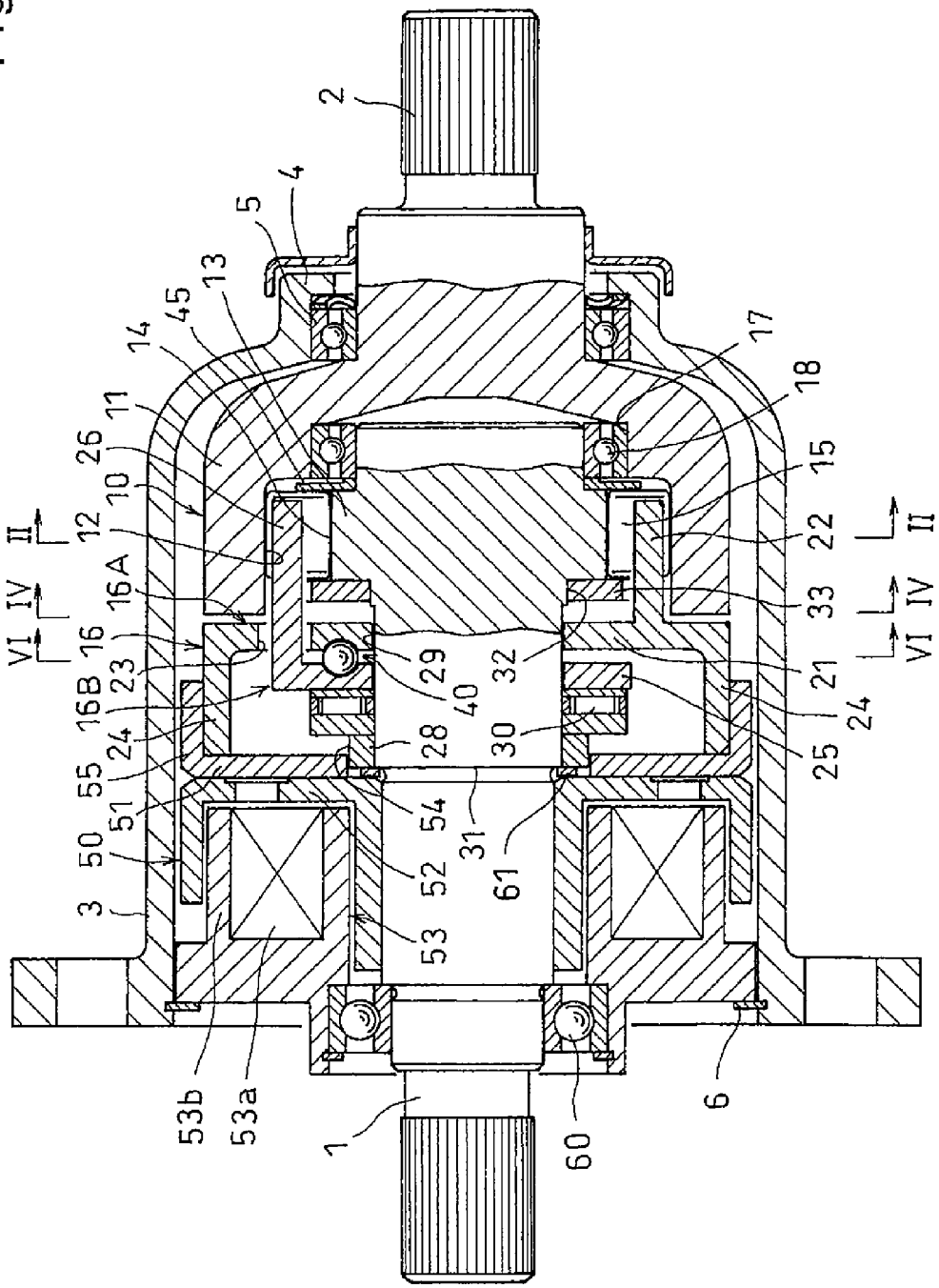
FIG. 1 is a vertical sectional view of a rotation transmission device embodying the present invention.

Now referring to the drawings, the embodiment of the present invention is described. FIG. 1 shows a rotation transmission device embodying the present invention. As shown, this rotation transmission device includes an input shaft 1, an output shaft 2 arranged coaxial with the input shaft 1, and a housing 3 covering the opposed end portions of the shafts 1 and 2. The rotation transmission device further includes a two-way clutch 10 mounted in the housing 3 and configured to selectively transmit rotation from the input shaft 1 to the output shaft 2, and an electromagnetic clutch 50 mounted in the housing 3 and configured to selectively engage and disengage the two-way clutch 10.

The housing 3 is a cylindrical member having a small-diameter bearing tube 4 at one end of the housing 3. A bearing 5 is mounted in the bearing tube 4 and rotatably supports the output shaft 2.

Figure 2:
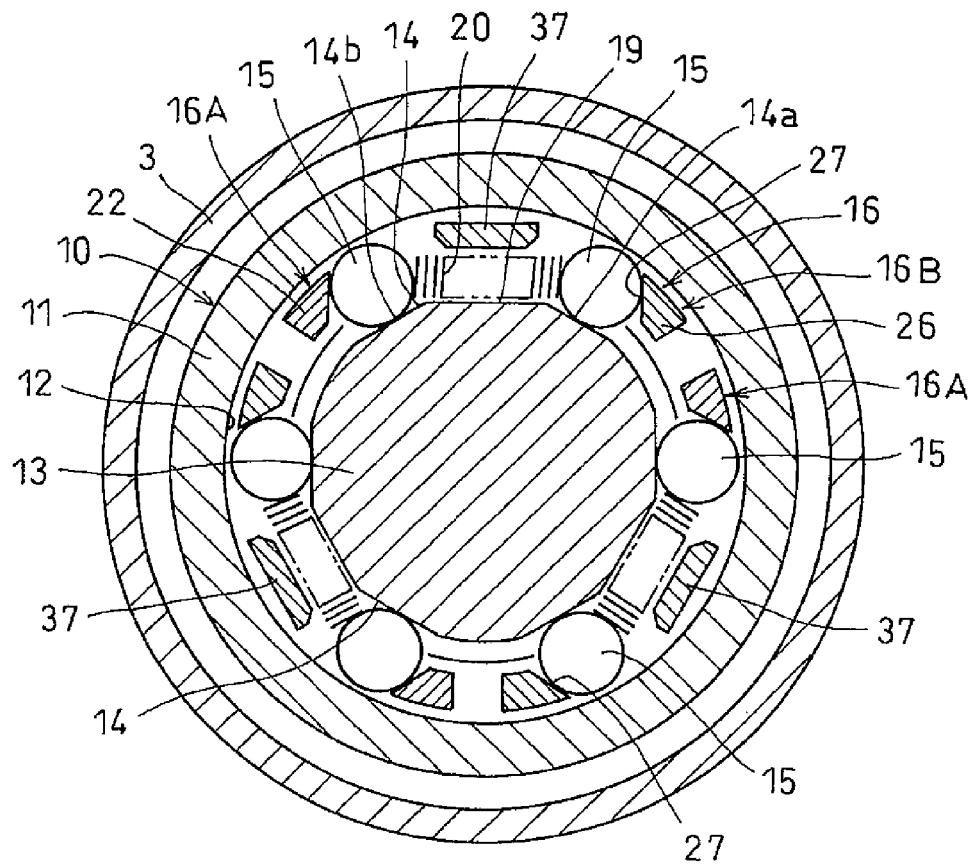
FIG. 2 is a sectional view taken along line II-II of FIG. 1.
Figure 3:
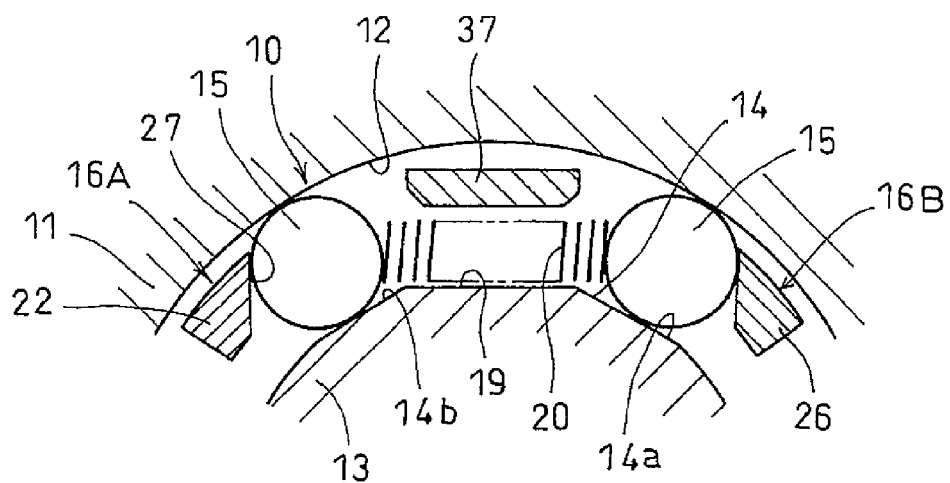
FIG. 3 is an enlarged sectional view of a portion of FIG. 2.

Referring to FIGS. 1 to 3, the two-way clutch 10 includes an outer ring 11 provided at the end of the output shaft 2 and formed with a cylindrical surface 12 on the inner periphery of the outer ring 11, and an inner ring 13 provided at the end of the input shaft 1 and formed with a plurality of circumferentially arranged cam surfaces 14 on the outer periphery of the inner ring 13. A pair of rollers 15 as engaging elements and an elastic member 20 are disposed between each cam surface 14 and the cylindrical surface 12. The two-way clutch 10 further includes a retainer 16 retaining the rollers 15 such that when the inner ring 13 rotates in one direction, one of each pair of rollers 15 engages the cylindrical surface 12 and the cam surface 14, thereby transmitting the rotation of the inner ring 13 to the outer ring 11, and when the inner ring 13 rotates in the other direction, the other of each pair of rollers 15 engages the cylindrical surface 12 and the cam surface 14, thereby transmitting the rotation of the inner ring 13 to the outer ring 11.

A small-diameter recess 17 is formed in the inner surface of the closed end of the outer ring 11. The input shaft 1 has its end rotatably supported by a bearing 18 mounted in the recess 17.

The inner ring 13 is integral with the input shaft 1. The cam surfaces 14, which are formed on the outer periphery of the inner ring 13, each include a pair of ramps 14a and 14b which are inclined in opposite directions to each other, and define wedge-shaped spaces narrowing toward the circumferential ends thereof in cooperation with the cylindrical surface 12 of the outer ring 11. Flat spring support surfaces 19 extend in the tangential directions of the inner ring 13 between the respective pairs of ramps 14a and 14b to support the respective elastic members 20.

Figure 5:
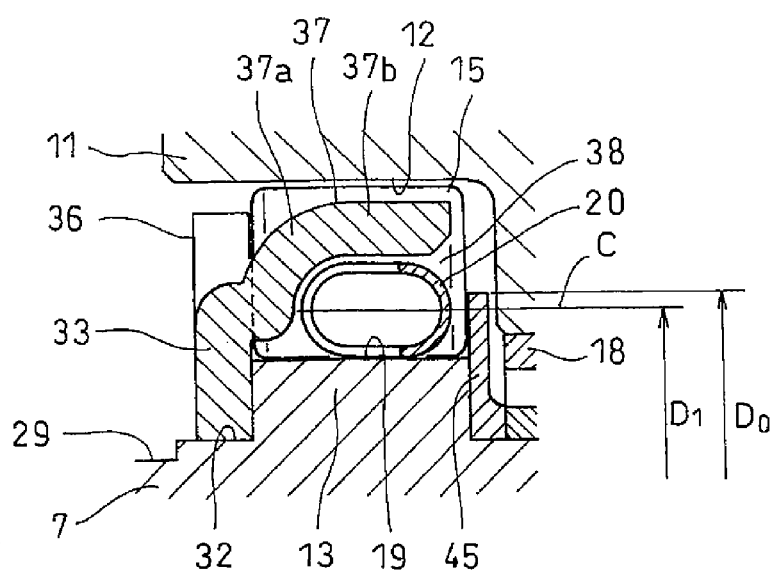
FIG. 5 is a sectional view taken along line V-V of FIG. 4.

The elastic members 20 are coil springs. In the embodiment, as shown in FIG. 5, the elastic members 20 have an elliptical cross-section. As shown in FIG. 3, the elastic members 20 are disposed between the respective pairs of rollers 15, thus biasing the respective pairs of rollers 15 away from each other toward standby positions where the rollers 15 can instantly engage the cylindrical surface 12 and the cam surfaces 14.

Referring to FIGS. 1-3 and 6, the retainer 16 comprises a control retainer member 16A and a rotary retainer member 16B. The control retainer member 16A includes an annular flange 21, and bars 22 equal in number to the number of the cam surfaces 14 and extending from the radially outer portion of one side of the annular flange 21 while being circumferentially equidistantly spaced apart from each other. The annular flange 21 is formed with circular arc-shaped elongated holes 23 between the respective adjacent pairs of bars 22. The control retainer member 16A further includes a tubular portion 24 extending from the radially outer edge of the annular flange 21 in the opposite direction to the bars 22.

The rotary retainer member 16B includes an annular flange 25, and bars 26 equal in number to the number of the cam surfaces 14 and extending from the radially outer edge of the annular flange 25 while being circumferentially equidistantly spaced apart from each other.

The control retainer member 16A and the rotary retainer member 16B are assembled together in such a way that the bars 26 of the rotary retainer member 16B extend through the respective elongated holes 23 of the control retainer member 16A such that the bars 22 and 26 are arranged circumferentially alternating with each other. In this assembled state, the distal ends of the bars 22 and 26 are disposed between the outer ring 11 and the inner ring 13, while the flange 21 of the control retainer member 16A and the flange 25 of the rotary retainer member 16B are disposed between a support ring 28 and a spring holder 33 which are both fitted on the outer periphery of the input shaft 1.

With the retainer members 16A and 16B mounted in position in this manner, as shown in FIGS. 2 and 3, pockets 27 are defined between the respective bars 22 of the control retainer member 16A and the corresponding bars 26 of the rotary retainer member 16B so as to radially face the respective cam surfaces 14 of the inner ring 13. A pair of the rollers 15 and one of the elastic members 20 are received in each pocket 27 with the rollers facing each other.

As shown in FIG. 1, the flange 21 of the control retainer member 16A and the flange 25 of the rotary retainer member 16B are supported by a slide guide surface 29 formed on the outer periphery of the input shaft 1 so as to be slidable along the slide guide surface 29. A thrust bearing 30 is mounted between the flange 25 of the rotary retainer member 16B and the support ring 28, which is fitted on the input shaft 1.

The thrust bearing 30 rotatably supports the rotary retainer member 16B while preventing the rotary retainer member 16B from moving toward the electromagnetic clutch 50.

Figure 6:
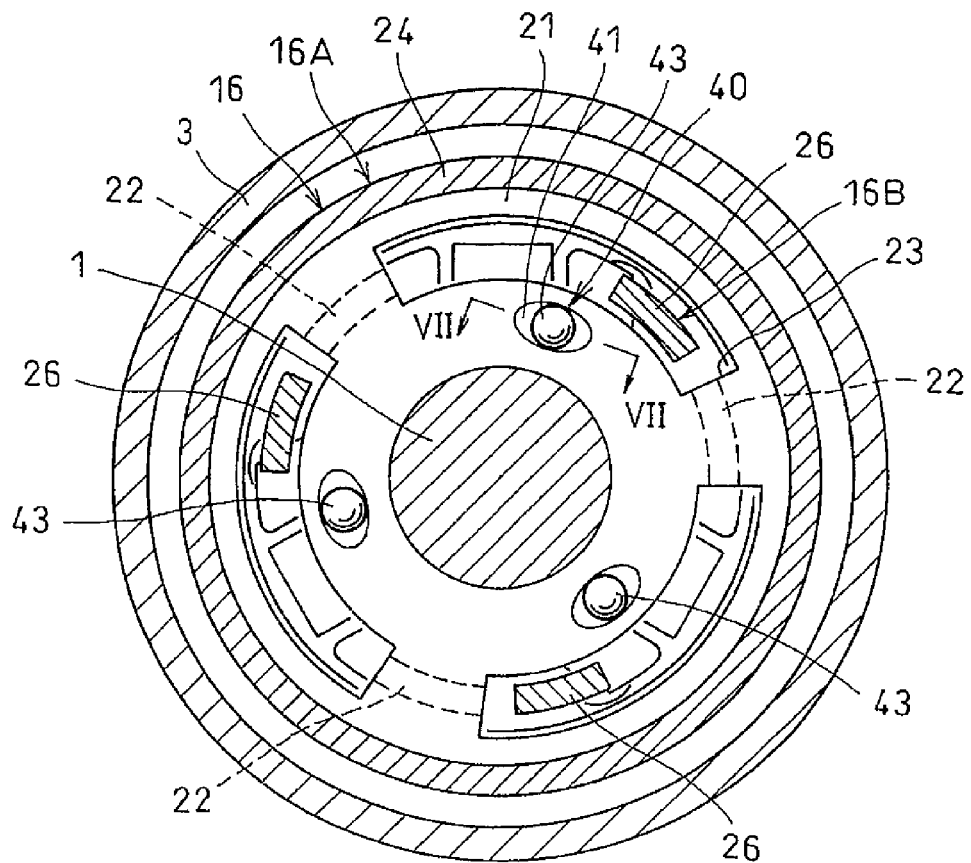
FIG. 6 is a sectional view taken along line VI-VI of FIG. 1.

As shown in FIGS. 1 and 6, a motion converter mechanism in the form of a torque cam 40 is provided between the flange 21 of the control retainer member 16A and the flange 25 of the rotary retainer member 16B to convert the axial movement of the control retainer member 16A to the relative rotary motion between the control retainer member 16A and the rotary retainer member 16B.

Figure 7A:
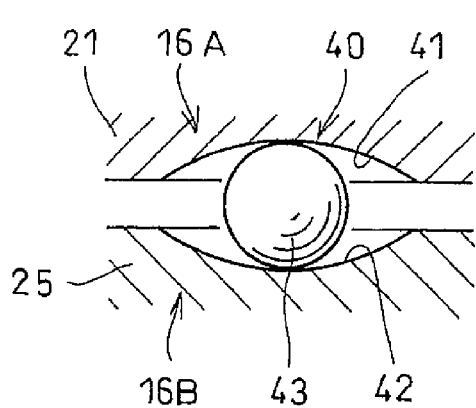
FIG. 7(a) is a sectional view taken along line VII-VII of FIG. 6.
Figure 7B:
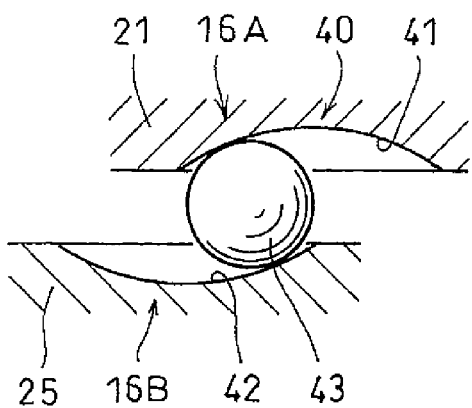
FIG. 7(b) is a similar sectional view showing another operational state.

As shown in FIGS. 7(a) and 7(b), the torque cam 40 includes opposed pairs of cam grooves 41 and 42 formed in the respective opposed surfaces of the flange 21 of the control retainer member 16A and the flange 25 of the rotary retainer member 16B. The cam grooves 41 and 42 are each deepest at the circumferential center and its depth gradually decreases toward the respective circumferential ends. A ball 43 is mounted between one circumferential end of one of each opposed pair of cam grooves 41 and 42 and the opposite circumferential end of the other of the pair of cam grooves 41 and 42.

The cam grooves 41 and 42 shown are circular arc-shaped grooves, but V-shaped cam grooves may be used instead.

The torque cam 40 is configured such that when the control retainer member 16A is moved in the axial direction in which the flange 21 of the control retainer member 16A approaches the flange 25 of the rotary retainer member 16B, the balls 43 of the torque cam 40 roll toward the deepest points of the respective opposed pairs of cam grooves 41 and 42 (shown in FIG. 7(a)), thereby rotating the control retainer member 16A and the rotary retainer member 16B relative to each other in the direction in which the circumferential widths of the pockets 27 decrease.

Figure 4:
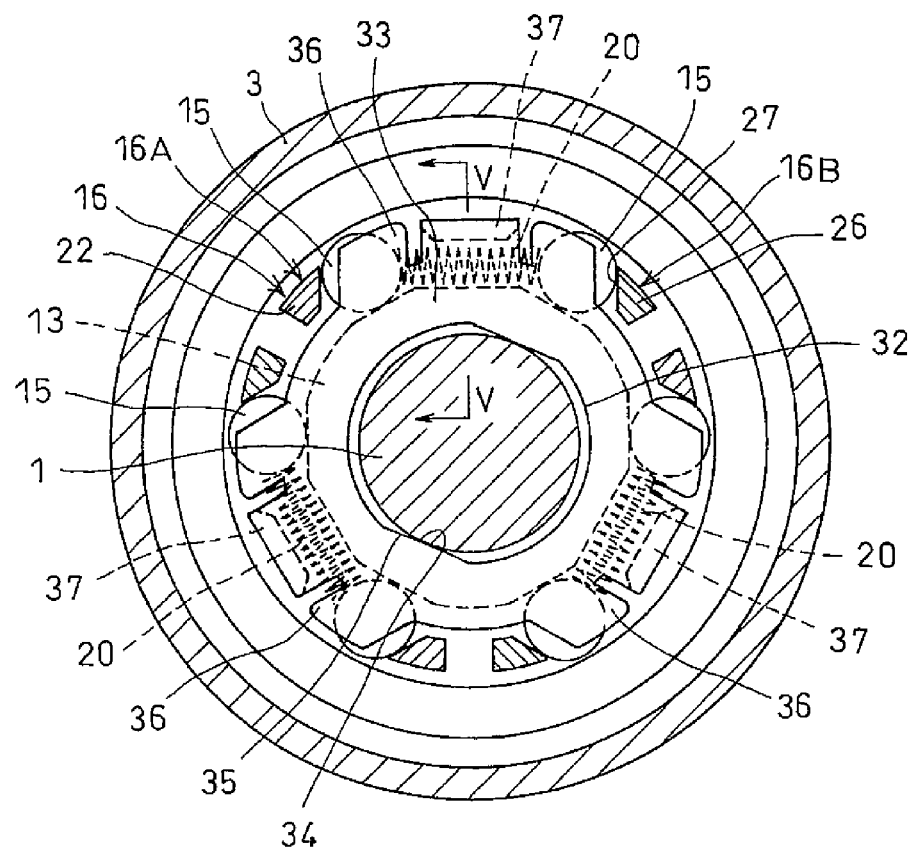
FIG. 4 is a sectional view taken along line IV-IV of FIG. 1.

Referring to FIGS. 1, 4 and 5, a cylindrical holder fitting surface 32 is formed at the corner between a first axial end surface of the inner ring 13 and the slide guide surface 29. The holder fitting surface 32 has a larger diameter than the slide guide surface 29. A spring holder 33 is fitted on the holder fitting surface 32 and is in abutment with the first axial end surface of the inner ring 13.

Figure 8:
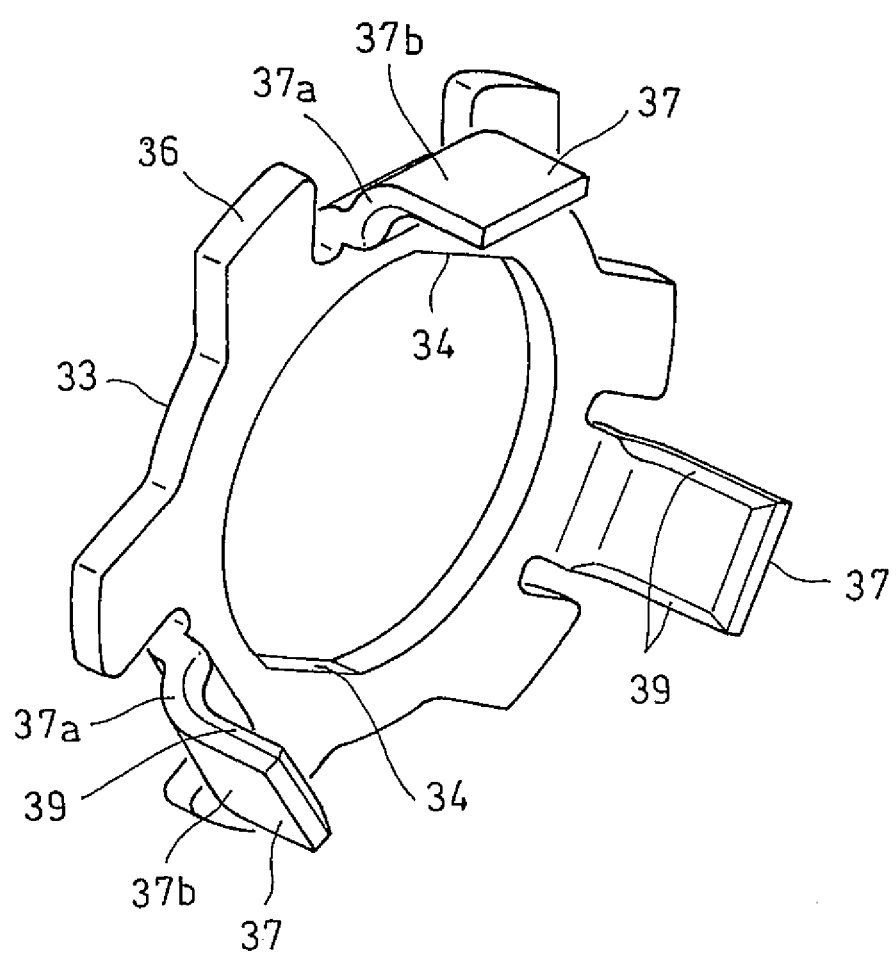
FIG. 8 is a perspective view of a spring holder shown in FIG. 4.

As shown in FIGS. 4 and 8, the spring holder 33 has a diametrically opposed pair of engaging surfaces 34 on the inner periphery thereof. The engaging surfaces 34 are in engagement with respective flat surface portions 35 of the holder fitting surface 32, thereby keeping the spring holder 33 rotationally and axially fixed in position.

The spring holder 33 is formed with positioning pieces 36 on its outer periphery which protrude into the pockets 27 of the retainer 16. The positioning pieces 36 each have first and second circumferential side surfaces, and are configured to restrict the rotation angles of the control retainer member 16A and the rotary retainer member 16B in the disengaging direction by supporting the bars 22 of the control retainer member 16A on the respective first circumferential side surfaces and supporting the bars 26 of the rotary retainer member 16B on the second circumferential side surfaces. The positioning pieces 36 also prevent movement of the rollers 15 toward the first end of the inner ring 13.

As shown in FIG. 5, each positioning piece 36 has a spring support piece 37 which prevents radially outward movement of the corresponding elastic member 20. Each of the spring support pieces 37 is an L-shaped plate member including an arc portion 37a integrally connected to the positioning piece 36, and an axially extending portion 37b integrally connected to the distal end of the arc portion 37a to extend parallel to the outer periphery of the inner ring 13. The axially extending portion 37b is located radially outwardly of the elastic member 20, preventing radially outward movement of the elastic member 20. An opening 38 is defined between the distal end of the axially extending portion 37b and the outer peripheral surface of the inner ring 13 such that the elastic member 20 can be inserted through the opening 38.

If sharp edges are defined along the intersections between the inner peripheral surface and the respective circumferential side surfaces, of each spring support piece 37, the elastic member 20 may get caught on such edges when the elastic member 20 is compressed, thus making smooth compression of the elastic member 20 difficult. In order to avoid this problem, as shown in FIG. 8, tapered surfaces 39 are formed along the intersections between the inner surface and the respective circumferential side surfaces, of each spring support piece 37.

The spring holder 33 is formed by pressing a steel plate.

As shown in FIG. 5, a washer 45 is fitted on the input shaft 1 at its end so as to abut both the second axial end surface of the inner ring 13 and the bearing 18, which rotationally support the end of the input shaft 1.

The washer 45 has an outer diameter $D_0$ larger than the diameter $D_1$ of a circle on which the centers of the elastic members 20 lie. The washer 45 prevents separation of the rollers 15 and the elastic members 20 toward the second end of the inner ring 13.

As shown in FIG. 1, the electromagnetic clutch 50 includes an armature 51 axially facing the end surface of the tubular portion 24 of the control retainer member 16A, a rotor 52 axially facing the armature 51, and an electromagnet 53 axially facing the rotor 52.

The armature 51 is fitted on a cylindrical radially outer surface 54 of the support ring 28 and rotatably and slidably supported by the support ring 28. The armature 51 has a coupling tube 55 at its outer peripheral portion in which the tubular portion 24 of the control retainer member 16A is press-fitted such that the control retainer member 16A and the armature 51 are fixedly coupled together. Since these two members are fixedly coupled together, the armature 51 is slidably supported by two axially spaced apart surfaces, i.e. by the cylindrical radially outer surface 54 of the support ring 28 and by the slide guide surface 29, which is formed on the outer periphery of the input shaft 1.

The support ring 28 is axially fixed in position by being brought into abutment with a shoulder 31 of the input shaft 1 formed at the second axial end of the slide guide surface 29, and is also rotationally fixed relative to the input shaft 1.

The rotor 52 is axially positioned by a shim 61 disposed between the rotor 52 and the support ring 28, and is also rotationally fixed relative to the input shaft 1.

The electromagnet 53 comprises an electromagnetic coil 53a and a yoke 53b supporting the electromagnetic coil 53a. The yoke 53b is fitted in the opening of the housing 3 at the second end of the housing and prevented from separating from the housing 3 by a snap ring 6 mounted in the opening of the housing at the second end of the housing. The yoke 53b is supported by the input shaft 1 through a bearing 60 fitted on the input shaft 1 so as to be rotatable relative to the input shaft 1.

Now in operation of the rotation transmission device embodying the present invention, while the electromagnetic coil 53a of the electromagnetic clutch 50, shown in FIG. 1, is not energized, the rollers 15 of the two-way clutch 10 are, as shown in FIG. 3, kept in engagement with the cylindrical surface 12 of the outer ring 11 and the cam surfaces 14 of the inner ring 13.

Thus, when the input shaft 1 is rotated in one direction in this state, the rotation of the input shaft 1 is transmitted from the inner ring 13 to the outer ring 11 through one of each pair of rollers 15, thus causing the output shaft 2 to be rotated in the same direction as the input shaft 1. When the input shaft 1 is rotated in the opposite direction, the rotation of the input shaft 1 is transmitted to the output shaft 2 through the other of each pair of rollers 15.

With the two-way clutch 10 in engagement as described above, when the electromagnetic coil 53a of the electromagnetic clutch 50 is energized, an attraction force is applied to the armature 51, so that the armature 51 is axially pulled toward and pressed against the rotor 52.

Since the armature 51 is fixedly coupled to the control retainer member 16A due to the coupling tube 55 and the tubular portion 24 being press-fitted together, when the armature 51 is moved axially, the control retainer member 16A is moved in the direction in which the flange 21 of the control retainer member 16A approaches the flange 25 of the rotary retainer member 16B.

When the control retainer member 16A and the rotary retainer member 16B move relative to each other in this direction, the balls 43 roll from the position shown in FIG. 7(b) toward the position shown in FIG. 7(a), where the balls 43 are located at the deepest points of the respective cam grooves 41 and 42. When the balls 43 roll in this direction, the control retainer member 16A and the rotary retainer member 16B are rotated relative to each other in the direction in which the circumferential widths of the pockets 27 decrease.

When the control retainer member 16A and the rotary retainer member 16B rotate relative to each other in this direction, each opposed pair of rollers 15, shown in FIG. 3, are pushed by the bar 22 of the control retainer member 16A and the bar 26 of the rotary retainer member 16B, respectively, toward each other, until the rollers 15 move to the neutral position.

After the opposed pairs of rollers 15 have disengaged from the cylindrical surface 12 and the respective cam surfaces 14, when the control retainer member 16A and the rotary retainer member 16B are further rotated relative to each other in the direction in which the circumferential widths of the pockets 27 decrease, the bars 22 and 26 of the retainer members 16A and 16B abut the side surfaces of the positioning pieces 36 of the spring holder 33, shown in FIG. 4, so that relative rotation between the control retainer member 16A and the rotary retainer member 16B stops, with the opposed pairs of rollers 15 disengaged.

In this state, since the rollers 15 are disengaged, when the input shaft 1 rotates, its rotation is not transmitted to the output shaft 2, so that the input shaft 1 rotates freely.

With the input shaft 1 rotating alone, when the electromagnetic coil 53a is de-energized, the attraction force applied to the armature 51 disappears, so that the armature 51 becomes rotatable. This causes the control retainer member 16A and the rotary retainer member 16B to be rotated relative to each other in the direction in which the circumferential widths of the pockets 27 increase, under the biasing force of the elastic members 20, until the rollers 15 are moved to a stand-by position where the rollers 15 can instantly engage the cylindrical surface 12 and the cam surfaces 14. In this state, torque is transmitted between the inner ring 13 and the outer ring 11 through one of each opposed pair of rollers 15.

If in this state the input shaft 1 is stopped and then rotated in the opposite direction, the rotation of the inner ring 13 is transmitted to the outer ring 11 through the other of each opposed pair of rollers 15.

When the electromagnetic coil 53a is de-energized, since the control retainer member 16A and the rotary retainer member 16B are rotated relative to each other in the direction in which the circumferential widths of the pockets 27 increase such that the rollers 15 are moved to the stand-by position, where the opposed pairs of rollers 15 can instantly wedge into the cylindrical surface 12 and the respective cam surfaces 14, the rollers 15 scarcely move in the rotational direction when the clutch engages. Thus, the rotation of the inner ring 13 can be instantly transmitted to the outer ring 11.

Since the rotation torque of the inner ring 13 is transmitted to the outer ring 11 through rollers 15 which are equal in number to the cam surfaces 14, it is possible to transmit large rotation torque from the inner ring 13 to the outer ring 11.

When the control retainer member 16A and the rotary retainer member 16B rotate relative to each other in the direction in which the circumferential widths of the pockets 27 increase, the balls 43 roll toward the shallow portions of the respective opposed pairs of cam grooves 41 and 42 until the balls 43 reach the position shown in FIG. 7(*b*).

Since the rotation transmission device is configured such that the two-way clutch 10 engages when the electromagnetic clutch 50 is switched off, and the two-way clutch 10 disengages when the electromagnetic clutch 50 is switched on, this rotation transmission is especially suitable for applications where it is necessary to meet fail safe requirements.

In the embodiment, the spring support pieces 37 of the spring holder 33, which prevent radially outward movement of the elastic members 20, are plate-shaped members that are located radially outwardly of the respective elastic members 20, and the openings 38 are defined between the distal ends of the respective spring support pieces 37 and the outer periphery of the inner ring 13 such that the elastic members 20 can be inserted through the openings 38. In this arrangement, with each of the elastic members 20 positioned so as to face one of the openings 38 as shown in FIG. 9(*a*), by pushing the elastic member 20 into the opening 38 while compressing the elastic member 20, the elastic member 20 can be fitted in the space between the spring support surface 19 of the inner ring 13 and the portion of the spring support piece 37 facing the spring support surface 19.

Since the elastic members 20 are inserted in the same direction as the length directions of the bars 22 and 26 of the control retainer members 16A and the rotary retainer members 16B, the bars 22 and 26 never interfere with the elastic members 20 when the latter are fitted in position. The elastic members 20 can thus be easily fitted in position.

The rollers 15 may be mounted in the respective pockets 27 before or after mounting the elastic members 20. After mounting the elastic members 20 and the rollers 15 in position, or simultaneously with the mounting of the elastic members 20 and the rollers 15, the washer 45 is fitted onto the end of the input shaft 1.

Figure 9A:
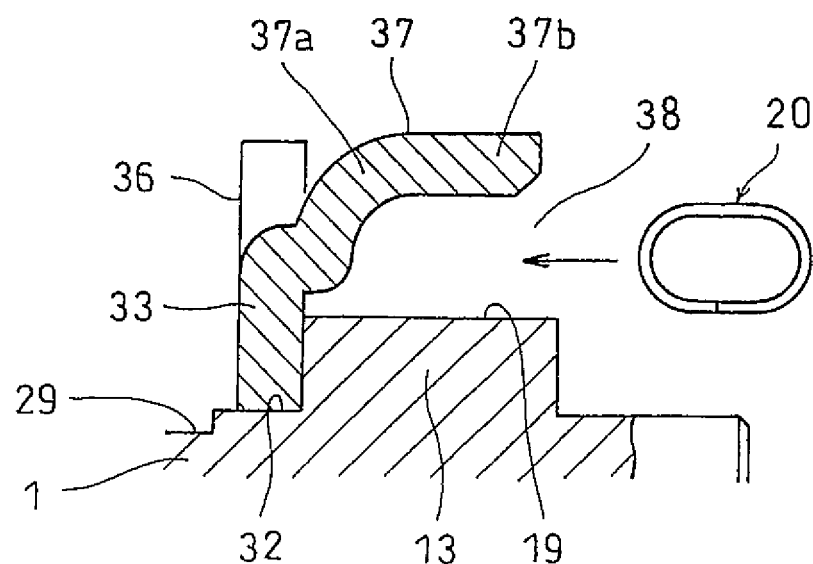
FIGS. 9(a) and 9(b) are sectional views showing, in a stepwise manner, how an elastic member is mounted.
Figure 9B:
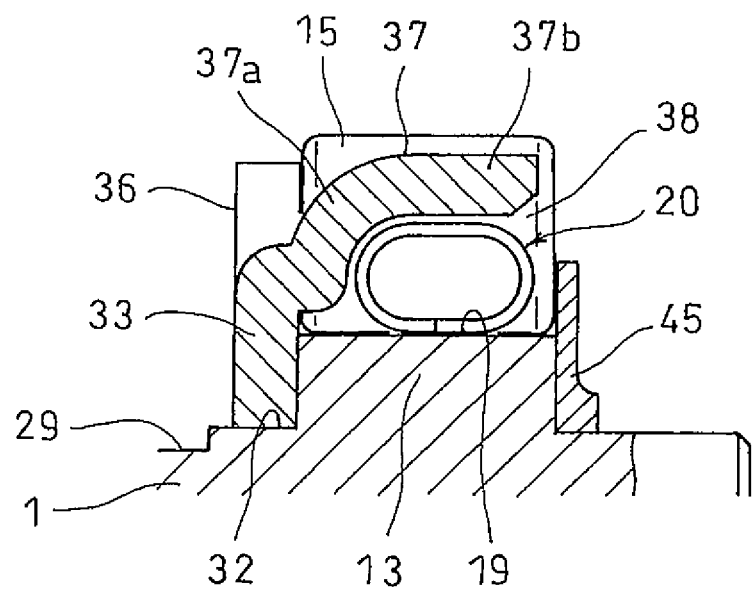

FIG. 9(*b*) shows the washer 45 as mounted in position. In this state, the washer 45 prevents movements of the elastic members 20 and the rollers 15 toward the second end of the inner ring 13. In other words, by mounting the washer 45 in position, the input shaft 1, rollers 15, elastic members 20, spring holder 33 and washer 45 form a sub-assembly. By inserting this sub-assembly into the outer ring 11 through its open end, the two-way clutch 10 is assembled.

In the embodiment shown in FIG. 1, since the control retainer member 16A and the rotary retainer member 16B are arranged such that the bars 22 and 26 thereof are disposed between the outer ring 11 and the inner ring 13, and the flanges 21 and 25 thereof, which axially face each other, are disposed between the outer ring 11 and the armature 51, it is possible to use an axially short and thus lightweight outer ring 11.

The two-way clutch 10 used in the rotation transmission device of the above embodiment is a roller type clutch configured such that when the electromagnet 53 is de-energized, the control retainer member 16A is moved axially, and the control retainer member 16A and the rotary retainer member 16B are rotated relative to each other in such a direction that the rollers 15 as the engaging elements engage the inner periphery of the outer ring 11 and the outer periphery of the inner ring 13. But the two-way clutch of the present invention is not limited to this particular clutch.

Figure 10:
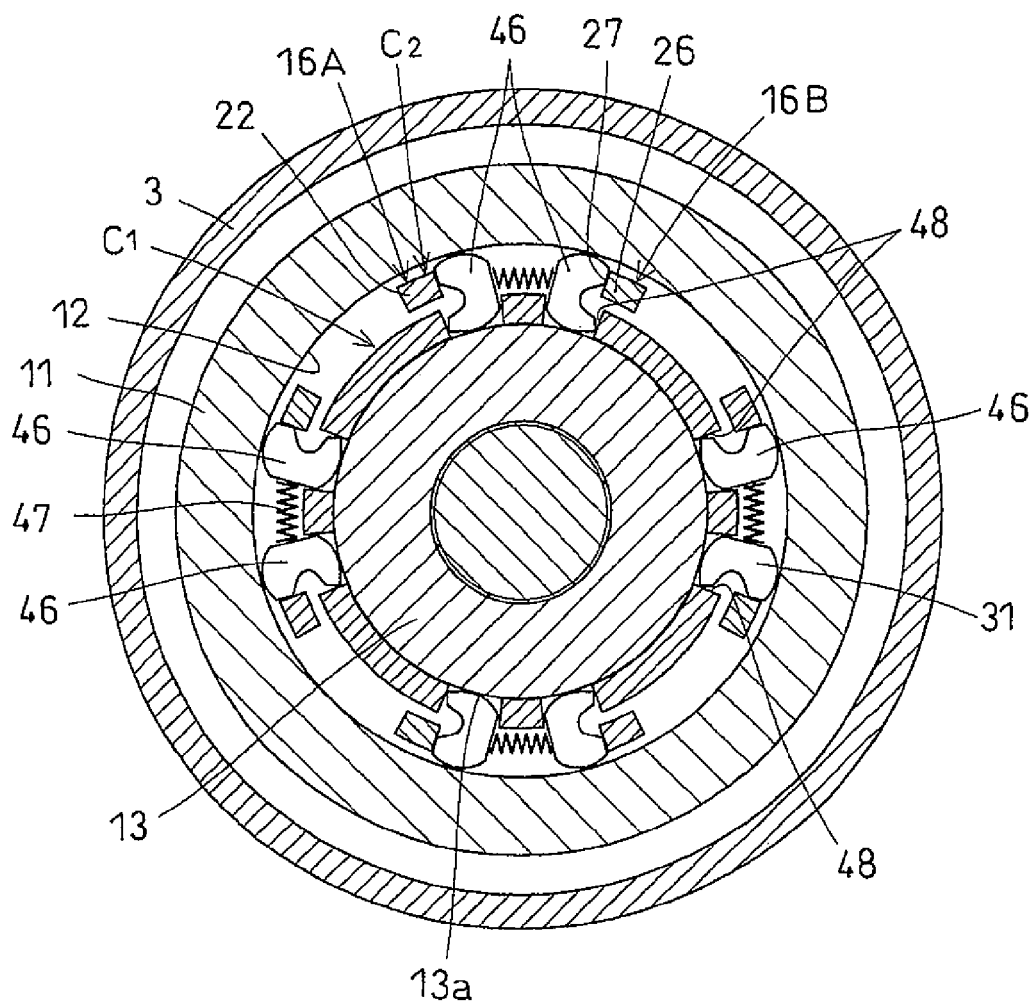
FIG. 10 is a sectional view of a different two-way clutch.

For example, the two-way clutch may be a sprag type clutch shown in FIG. 10, which includes a small-diameter retainer $C_1$, and a large-diameter retainer $C_2$ provided around the small-diameter retainer $C_1$ and comprising a control retainer member 16A and a rotary retainer member 16B which are exactly identical to the retainer members 16A and 16B used in the embodiment of FIGS. 1 and 2. A pair of sprags 46, as engaging elements, and an elastic member 47 are mounted in each of the pockets 27 defined between adjacent pairs of the bars 22 of the control retainer member 16A and the bars 26 of the rotary retainer member 16B, with the elastic member 47 disposed between the pair of sprags 46. The sprags 46 have their inner ends inserted in respective ones of pockets 48 formed in the small-diameter retainer $C_1$ so as to be pivotable about the inner ends.

In the embodiment in which the sprag type two-way clutch 10 is used, when the electromagnet 53 of the electromagnetic clutch 50 is de-energized, each pair of sprags 46 are pivoted such that their outer ends move away from each other under the biasing force of the elastic member 47, thus engaging the inner cylindrical surface 12 of the outer ring 11 and the outer cylindrical surface 13a of the inner ring 13. When the electromagnet 53 is energized, the control retainer member 16A is moved axially and simultaneously, the control retainer member 16A and the rotary retainer member 16B are rotated relative to each other in such a direction that the bars 22 and 26 of the respective retainer members push the sprags 46 such that the outer ends of each pair of sprags 46 move toward each other, until the sprags 46 disengage from the inner cylindrical surface 12 of the outer ring 11 and the outer cylindrical surface 13a of the inner ring 13.

In the embodiment of FIG. 4, the control retainer member 16A and the rotary retainer member 16B are kept in the neutral position, where the rollers 15 are moved to the disengaged position against the force of the elastic members, by bringing the bars 22 into abutment with the first circumferential side surfaces of the positioning pieces 36, which are formed at the outer peripheral portion of the spring holder 33, and the bars 26 into abutment with the second circumferential side surfaces of the positioning pieces 36. Thus, the positioning pieces 36 serve as a rotation angle restricting means which allows relative rotation of the control retainer member 16A and the rotary retainer member 16B up to the neutral position but prevents further relative rotation of the retainer members 16A and 16B in the same direction from the neutral position. However, the rotation angle restricting means according to the present invention is not limited to this particular one.

Figure 11:
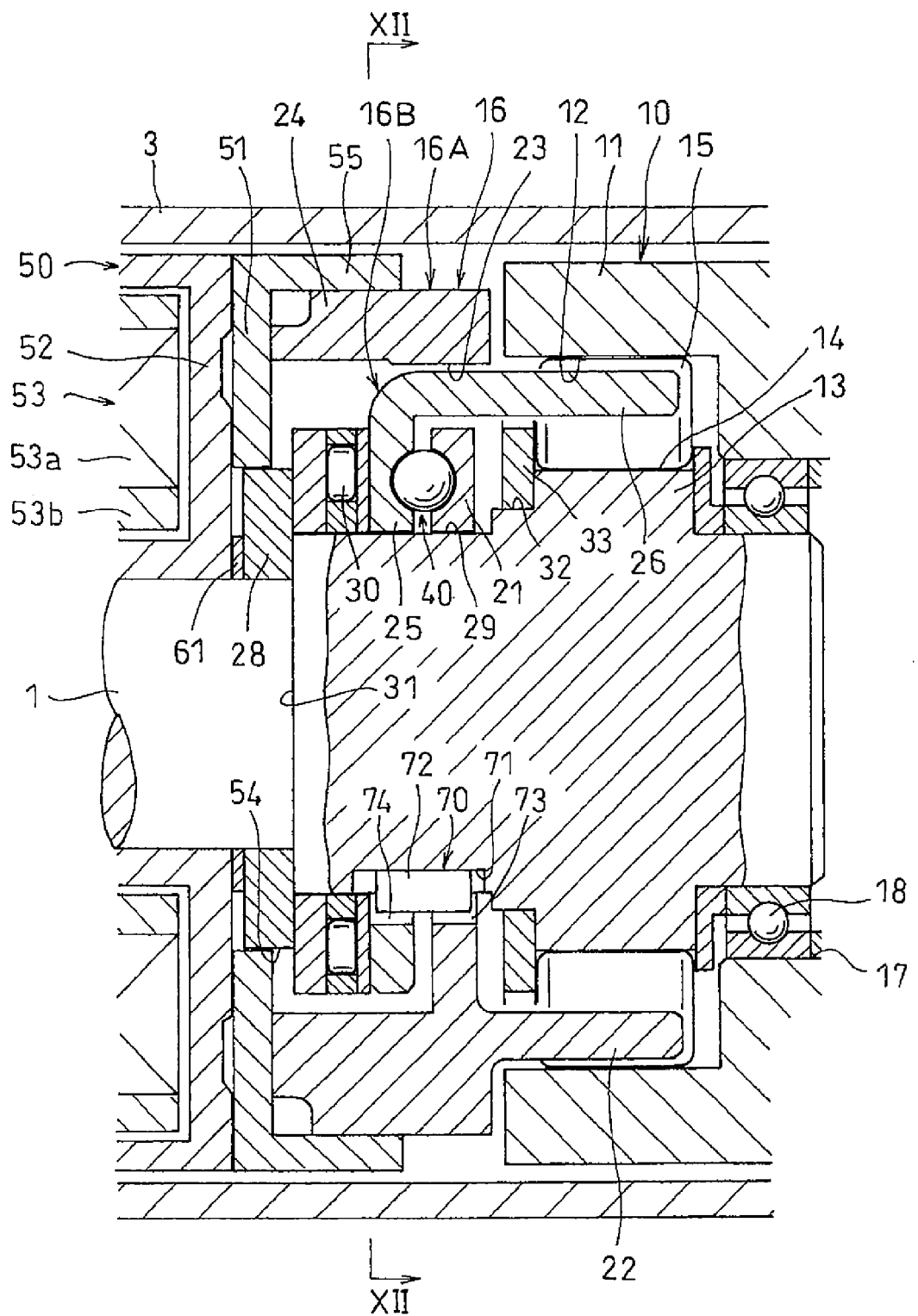
FIG. 11 is a sectional view of a different rotation transmission device embodying the present invention.

FIGS. 11 to 13 show a different rotation angle restricting means, which is shown at 70 in FIGS. 11 to 13. The rotation angle restricting means 70 includes a protrusion in the form of a key 72 fixedly fitted in an axial groove 71 formed in the outer periphery of the input shaft 1. The rotation angle restricting means 70 further includes a cutout 73 formed in the inner periphery of the flange 21 of the control retainer member 16A, and a cutout 74 formed in the inner periphery of the flange 25 of the rotary retainer member 16B. The key 72 is loosely fitted in both of the cutouts 73 and 74. The key 72 and the cutouts 73 and 74 are configured such that the control retainer member 16A is kept in the neutral position when the key 72 abuts one side wall of the cutout 73, while the rotary retainer member 16B is kept in the neutral position when the key 72 abuts the side wall of the cutout 74 which is on the opposite side of the one side wall of the cutout 73. In FIG. 13(a), both the control retainer member 16A and the rotary retainer member 16B are in their respective neutral positions.

The rotation angle restricting means 70 is configured such that when the two-way clutch 10 is engaged, the key 72 on the input shaft 1 is, as shown in FIG. 13(b), spaced apart from both side walls of either of the cutout 73 formed in the flange 21 of the control retainer member 16A, and the cutout 74 formed in the flange 25 of the rotary retainer member 16B.

When the rotation angle restricting means 70 is used, the positioning pieces 36 of the spring holder 33, shown in FIG. 4, are replaced with projections narrower in width than the positioning pieces 36 such that while the control retainer member 16A and the rotary retainer member 16B are kept in their respective neutral positions by the rotation angle restricting means 70, the bars 22 and 26 are kept out of contact with both side surfaces of the respective projections.

By providing the rotation angle restricting means 70, which can keep the control retainer member 16A and the rotary retainer member 16B in their respective neutral positions, between the input shaft 1 and the retainer members 16A and 16B, impact when the control retainer member 16A and the rotary retainer member 16B are moved to and stopped at the respective neutral positions is applied only to the input shaft 1 and not to the spring holder 33, shown in FIG. 4.

This prevents the spring holder 33 from becoming loose and interfering with axial movement of the control retainer member 16A. This in turn prevents untimely engagement of the two-way clutch 10, allowing accurate operation of the two-way clutch 10.

Figure 14:
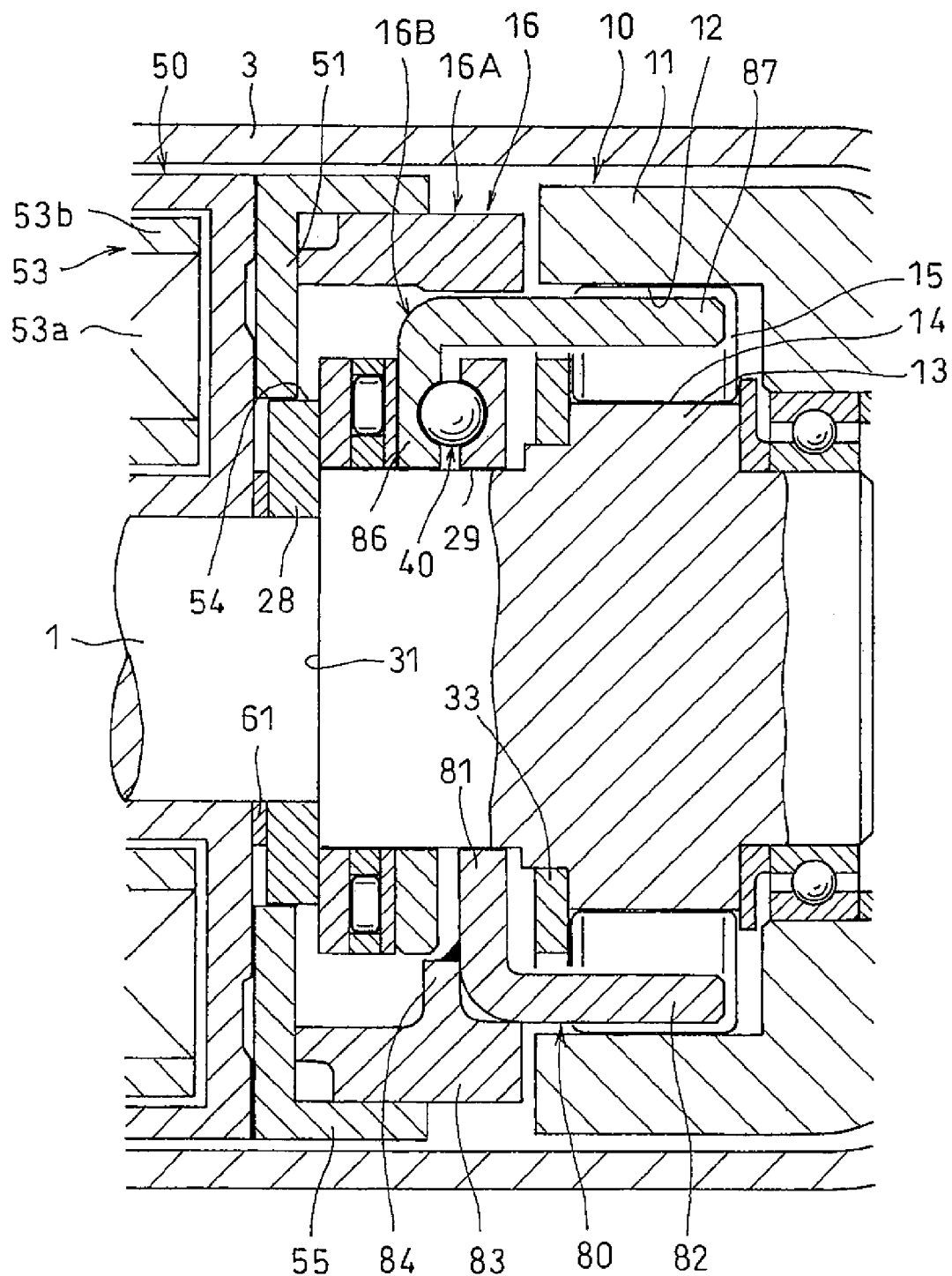
FIG. 14 is a sectional view of a still different rotation transmission device embodying the present invention.
Figure 17:
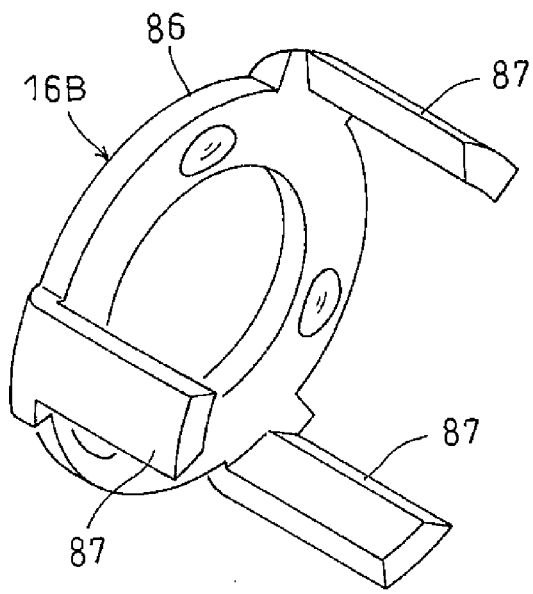
FIG. 17 is a perspective view of a rotary retainer member shown in FIG. 14.

FIGS. 14 and 17 show a different rotation transmission device embodying the present invention. The rotation transmission device of this embodiment differs from the rotation transmission device shown in FIG. 1 in that the control retainer member 16A and the rotary retainer member 16B are formed by pressing.

The control retainer member 16A of this embodiment comprises a retainer body 80 formed by pressing, and a tubular member 83. The retainer body 80 includes an annular flange 81, and bars 82 extending from the outer peripheral portion of one side of the annular flange 80 so as to be circumferentially equidistantly spaced apart from each other. The bars 82 are equal in number to the number of the cam surfaces 14 formed on the outer periphery of the inner ring 13.

The tubular member 83 is sized such that the tubular member 83 can be fitted around the outer peripheries of the bars 82, and is formed with coupling pieces 84 on the radially inner surface thereof which are equal in number to the number of the bars 82 and are arranged at equal intervals.

The retainer body 80 and the tubular member 83 are fitted together by inserting the end of the retainer body 80 including the flange 81 into the tubular member 83 until the flange 81 abuts the coupling pieces 84. In this state, the coupling pieces 84 and the flange 81 are joined together at their portions in abutment with each other, to form the control retainer member 16A. In the embodiment, they are joined together by welding, but may be joined together by diffusion bonding or adhesive bonding.

Figure 16A:
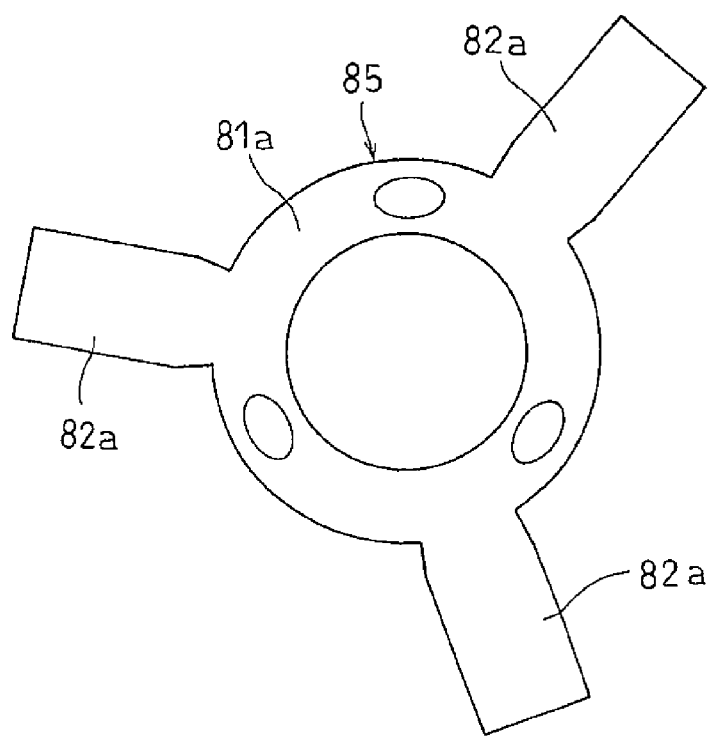
FIGS. 16(a) and 16(b) show, in a stepwise manner, how a retainer body of a control retainer member is manufactured.
Figure 16B:
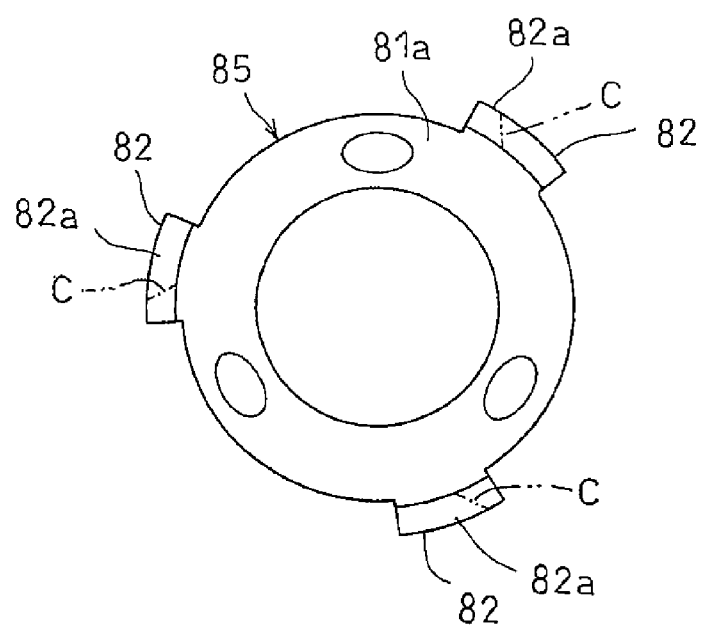

In forming the retainer body 80 by pressing, a blank 85 shown in FIG. 16(a) is formed by pressing (punching) a steel plate. As shown, the blank 85 includes an annular plate portion 81a having a plurality of bar-forming pieces 82a formed on the outer periphery of the annular plate portion 81a. The bar-forming pieces 82a of the blank 85 are bent by pressing by 90° relative to the annular plate portion 81a at their portions integrally connected to the annular plate portion 81a. FIG. 16(b) shows the blank 85 after the bar-forming pieces 82a have been bent in the above manner. After bending the bar-forming pieces 82a, the bar-forming pieces 82a are cut along chain lines C in FIG. 16(b) to form the bars 82, which are each formed with a tapered circumferential side surface.

Alternatively, the bars 82 may be formed separately from the flange 81, and may be joined to the flange 81 by welding, diffusion bonding or adhesive bonding.

Referring to FIG. 17, the rotary retainer member 16B of this embodiment includes an annular flange 86, and bars 87 extending from the outer peripheral portion of the annular flange 86 so as to be circumferentially equidistantly spaced apart from each other. The bars 87 are equal in number to the number of the cam surfaces 14. The rotary retainer member 16B is substantially identical in structure to the retainer body 80 shown in FIG. 15, except the lengths of the bars and the positions of the tapered surfaces.

The rotary retainer member 16B is formed by pressing in the same manner as the manner in which the retainer body 80 is formed by pressing as shown in FIGS. 16(a) and 16(b). Thus, the blank from which the rotary retainer member 16B is formed is not shown.

In this case too, the bars 87 may be formed separately from the annular flange 86, which is formed by pressing, and may be joined to the flange 86 by welding.

Figure 15:
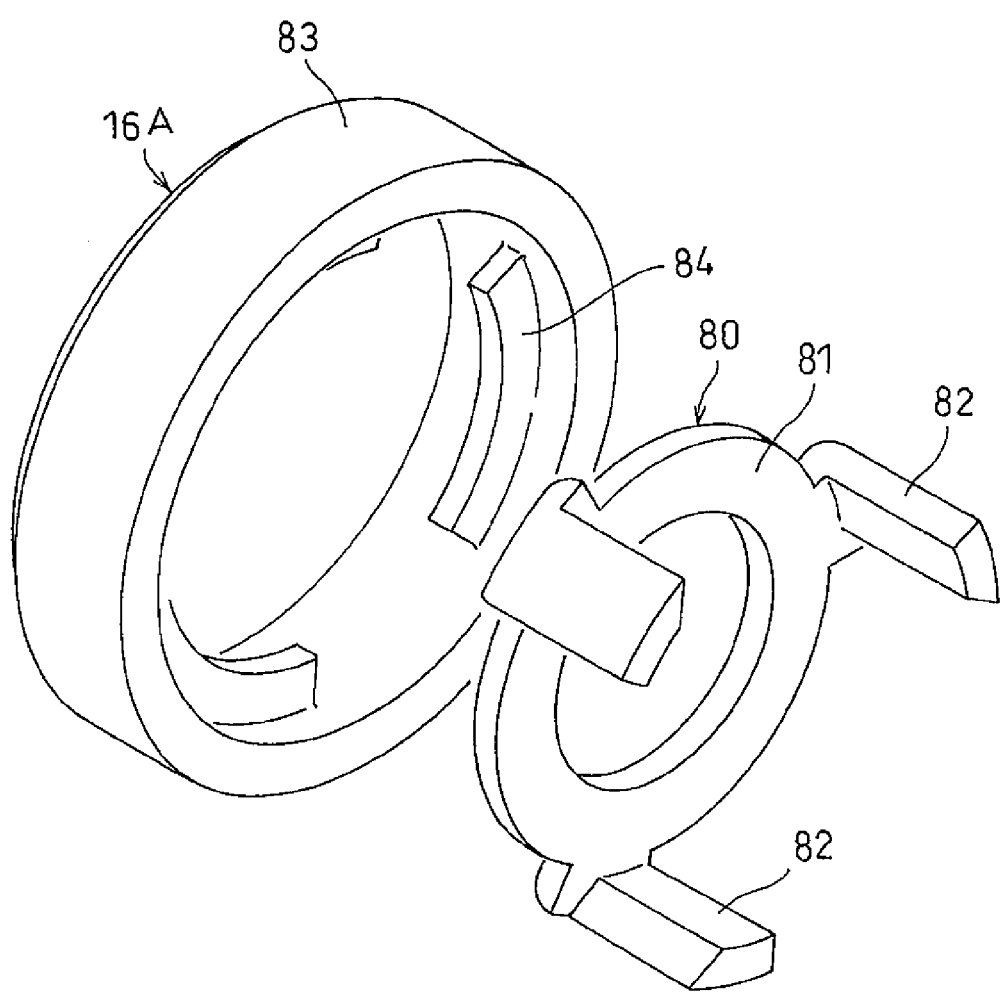
FIG. 15 is an exploded perspective view of a control retainer member shown in FIG. 14.

Since the retainer body 80 of the control retainer member 16A and the rotary retainer member 16B are formed by pressing as shown in FIGS. 15 to 17, the retainer members 16A and 16B of this embodiment can be manufactured at a lower cost.

Figure 18:
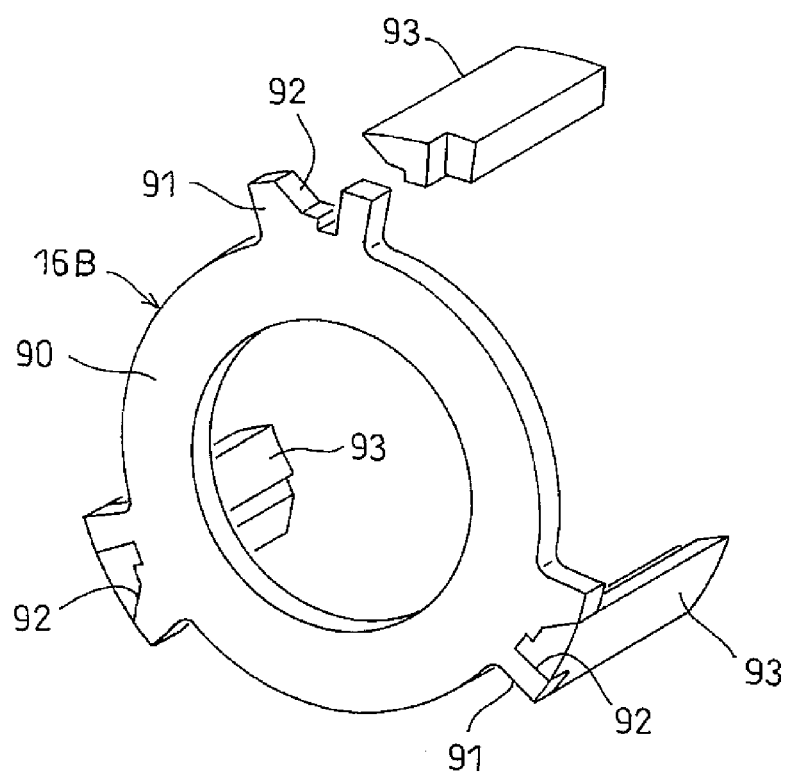
FIG. 18 is a partially exploded perspective view of a different rotary retainer member.

FIG. 18 shows a still different rotary retainer member 16B, which includes an annular flange 90 formed by pressing. A plurality of protruding pieces 91 are provided on the outer periphery of the annular flange 90 at equal intervals. Each protruding piece 91 is formed with a cutout 92. Bars 93 formed by pressing are fitted at one end in the respective cutouts 92 and joined to the protruding pieces 91 by diffusion bonding.

Since the rotary retainer member 16B of this embodiment comprises a flange 90 formed by pressing and having protruding pieces 91 on the outer periphery, and bars 93 formed by pressing separately from the flange 90, such a rotary retainer member 16B can be manufactured easily by fixedly joining the bars 93 to the respective protruding pieces 91.

FIGS. 19 to 22 show a still different rotation transmission device embodying the present invention. The rotation transmission device of this embodiment includes a male connector 100 connected to the electromagnet 53 and configured to be detachably connected to a female connector 104 provided at the terminal end of a power cord 103. The male connector 100 has a receptacle, into which the female connector 104 is detachably inserted, located at the open end of the housing 3.

Figure 20:
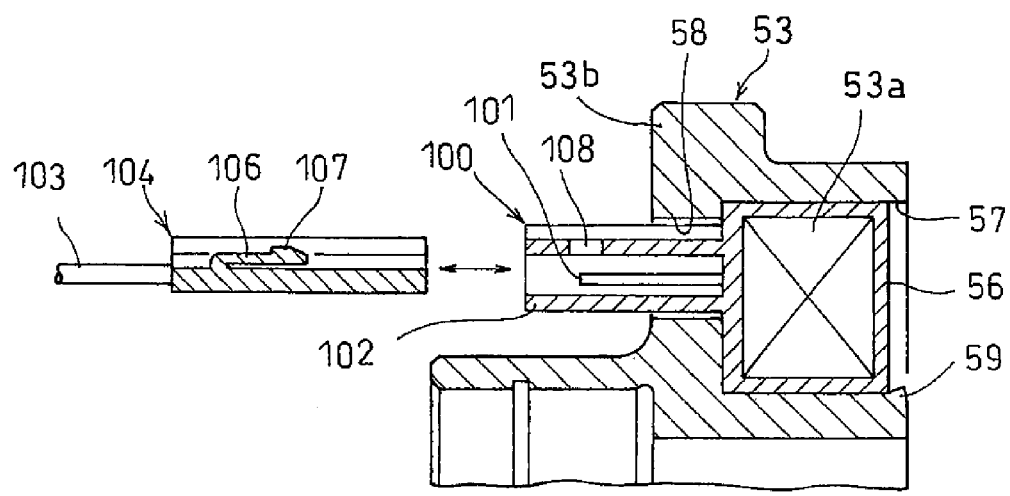
FIG. 20 is an enlarged sectional view of an electromagnet shown in FIG. 19.
Figure 21:
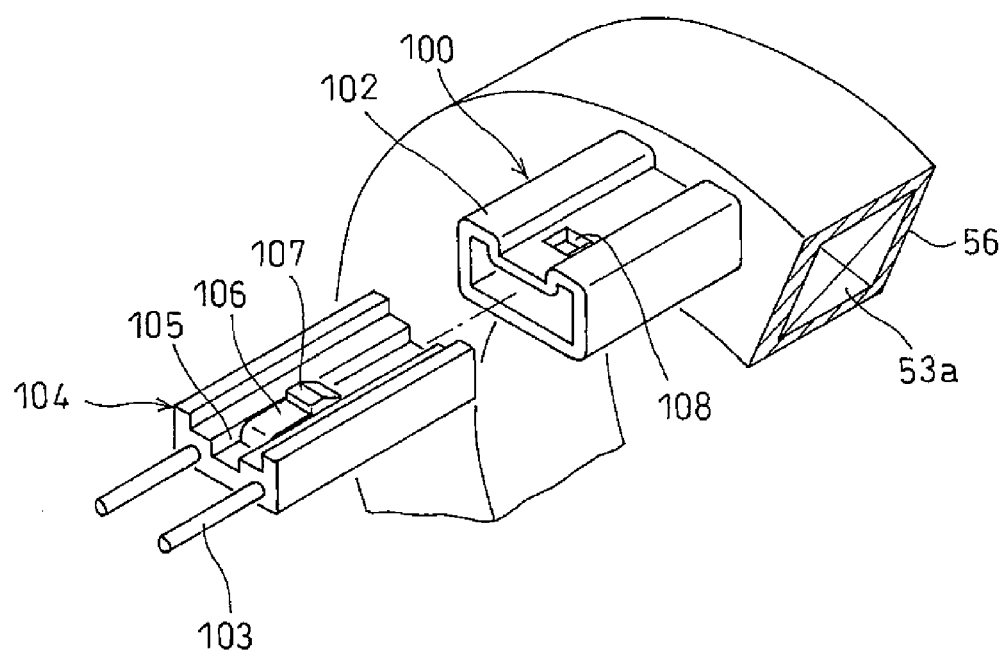
FIG. 21 is an exploded perspective view of a connector shown in FIG. 19.

As shown in FIGS. 20 and 21, the electromagnetic coil 53a is entirely covered by a coil cover 56 formed by resin molding. The male connector 100 is formed simultaneously when forming the coil cover 56.

The male connector 100 includes a terminal 101 connected to the terminal ends of the electromagnetic coil 53a, and a connecting tube 102 covering the terminal 101. The female connector 104, which is provided at the terminal end of the power cord 103, can be detachably inserted into the connecting tube 102.

Figure 19:
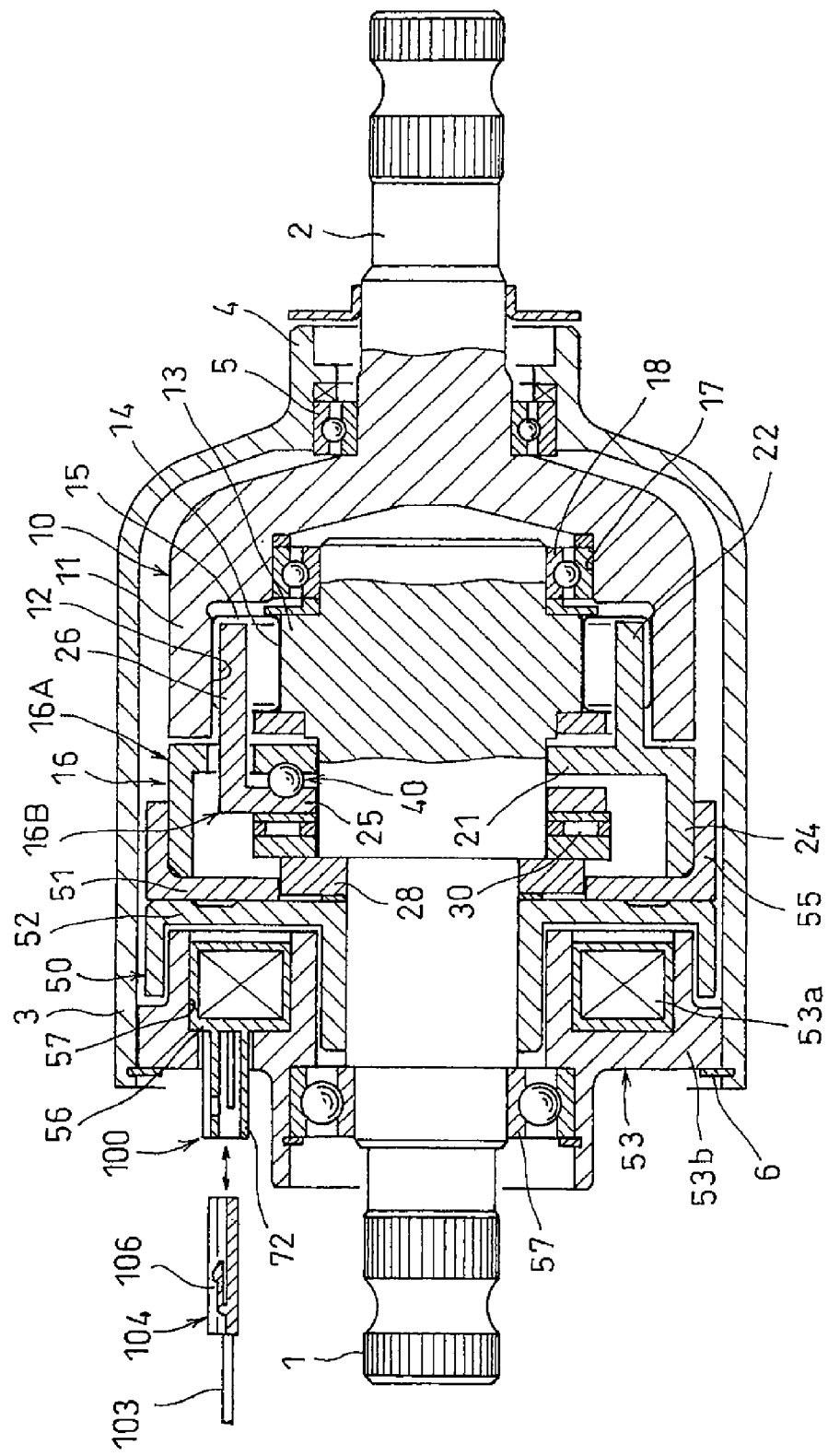
FIG. 19 is a sectional view of yet a different rotation transmission device embodying the present invention.

The yoke 53b is formed with an annular groove 57 in the end surface therefore facing the rotor 52, shown in FIG. 19. A connector inserting hole 58 is formed in the closed end surface of the annular groove 57. The coil cover 56 is fitted in the annular groove 57 with the male connector 100 extending through the connector inserting hole 58, so as not to be pulled out of the annular groove 57. In order to prevent the coil cover 56 from being pulled out of the groove 57, the opening of the groove 57 is crimped in the embodiment. Numeral 59 in FIG. 20 indicates a protrusion formed by such crimping.

Figure 22:
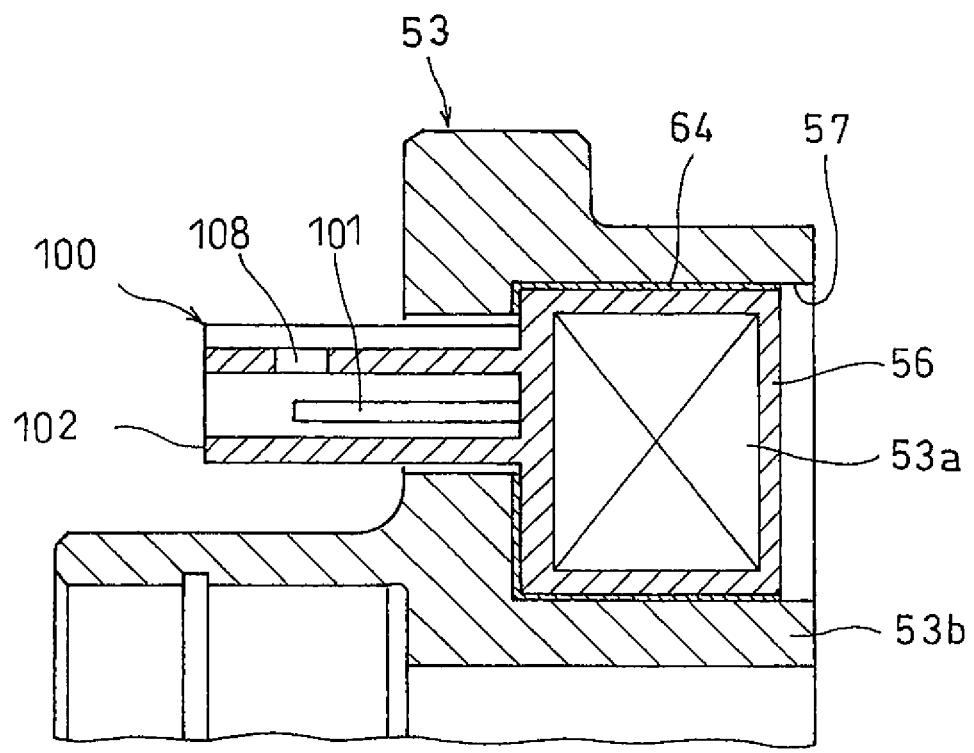
FIG. 22 is a sectional view of another measure for preventing separation of a coil cover molding the electromagnet relative to the housing.

Instead of crimping, as shown in FIG. 22, the coil cover 56 may be adhesively bonded to the inner surface of the annular groove 57 to prevent the coil cover 56 from being pulled out of the groove 57. Numeral 64 in FIG. 22 indicates the adhesive layer.

The female connector 104 has on its top surface a groove 105 extending from the front to rear end surface of the connector 104. An engaging claw 106 as an engaging portion is received in the groove 105, and is integrally connected to the female connector 104 at its trailing end with respect to the direction in which the female connector 104 is inserted into the connecting tube 102 of the male connector 100 such that the leading end of the engaging claw 106 can be flexed about the trailing end. The engaging claw 106 has a hook 107 at the leading end thereof.

The hook 107 is configured to be snap-fitted in an engaging hole 108 formed in the male connector 100 when connecting the female connector 104 to the male connector 100.

In this embodiment, as shown in FIGS. 20 to 22, simultaneously when forming the coil cover 56, in which the electromagnetic coil 53a of the electromagnet 53 is wrapped, the male connector 100 is formed, to which the female connector 104 provided at the terminal end of the power cord 103 can be detachably connected, and the male connector 100 is inserted in the connector inserting hole 58 formed in the yoke 53b such that the receptacle of the male connector 100, into which the female connector 104 is detachably inserted, is located at the open end of the housing 3. With this arrangement, no lead wire is necessary which extends to the outside of the rotation transmission device.

If a lead wire has to be used, the lead wire could get caught on other parts of the rotation transmission device while assembling the rotation transmission device, thus interfering with the assembling. Or this could lead to breakage of the lead wire. Since rotation transmission device of this embodiment needs no lead wire, it is free of the above-mentioned problems, so that it can be handled easily.

Figure 23:
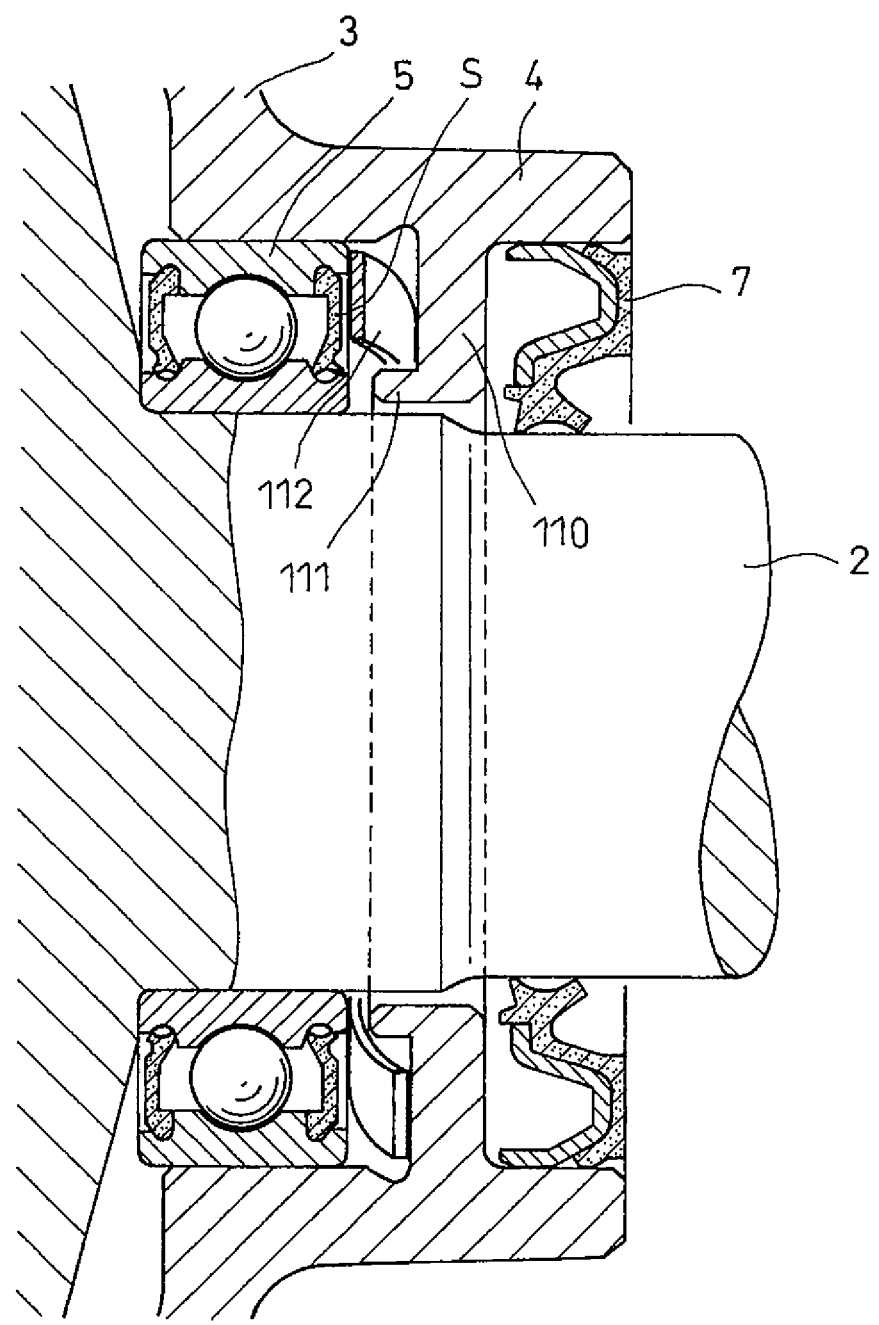
FIG. 23 is a sectional view showing how an elastic member is mounted in a bearing tube of the housing.

FIG. 23 shows a further different rotation transmission device embodying the present invention. In this rotation transmission device, the bearing 5 mounted in the bearing tube 4 of the housing 3 is a bearing having seals. A backup plate 110 is provided between this bearing 5 and a seal member 7 sealing the open end of the bearing tube 4. An elastic member 112 is mounted between the backup plate 110 and the bearing 5. The rotation transmission device of this embodiment is otherwise identical in structure to the rotation transmission device shown in FIG. 1. Thus, the entire view of this embodiment is omitted.

The backup plate 110 is integrally formed on radially inner surface of the bearing tube 4. The elastic member 112 mounted between the backup plate 110 and the bearing 5, which includes seals, is a wave spring 112 mounted in a compressed state.

By mounting the wave spring 112 in a compressed state between the sealed bearing 5 and the backup plate 110, the wave spring 112 biases the housing 3 and the internal components mounted in the housing 3, namely the two-way clutch 10 and the electromagnetic clutch 50, in opposite directions to each other, thus pressing the electromagnet 53 of the electromagnetic clutch 50 against the snap ring 6, which is mounted on the inner periphery of the housing 3 at the second end of the housing 3 to prevent separation of the internal components. The wave spring 112 thus prevents axial movements of the two-way clutch 10 and the electromagnetic clutch 50 relative to each other and relative to the housing 3.

This in turn ensures reliable operation of the two-way clutch 10. Also, compared to a conventional rotation transmission device in which a shim is used to prevent axial relative movements of the internal components, the rotation transmission device of this embodiment can be assembled easily and is less expensive.

While in FIG. 23, a wave spring is used as the elastic member 112, a disk spring may be used instead. The elastic member 112 is mounted in the bearing tube 4 in an uncompressed natural state. With the elastic member 112 mounted in an uncompressed state, the housing 3 and the internal components are moved relative to each other in the direction in which the internal components are pushed toward the elastic member 112, thereby axially compressing the elastic member 112. In this state, the snap ring 6 for preventing separation of the electromagnet is mounted at the opening of the housing 3 at the second end thereof.

Since the elastic member 112 is compressed in the axial direction, the elastic member 112 is radially expanded by its own spring force. If the elastic member 112 is radially expanded such that its axis is displaced from the axis of the housing 3, uneven loads will be applied to both the housing and the internal components due to pressure imbalance, thus making it impossible to sufficiently reduce axial movements of the internal components relative to each other and to the housing 3.

Thus, in this embodiment, the backup plate 110 is provided at its radially inner portion with a guide ring 111 having such an outer diameter that the elastic member 112 can be fitted thereon while the elastic member 112 is in an uncompressed natural state. With the elastic member 112 supported and retained by the guide ring 111 so as to be coaxial with the housing 3, the elastic member 112 is axially compressed by moving the housing 3 and the internal components relative to each other. With this arrangement, when the elastic member 112 is compressed, the elastic member 112 can be radially expanded by its own elastic force without its axis being displaced from the axis of the housing 3.

Figure 24:
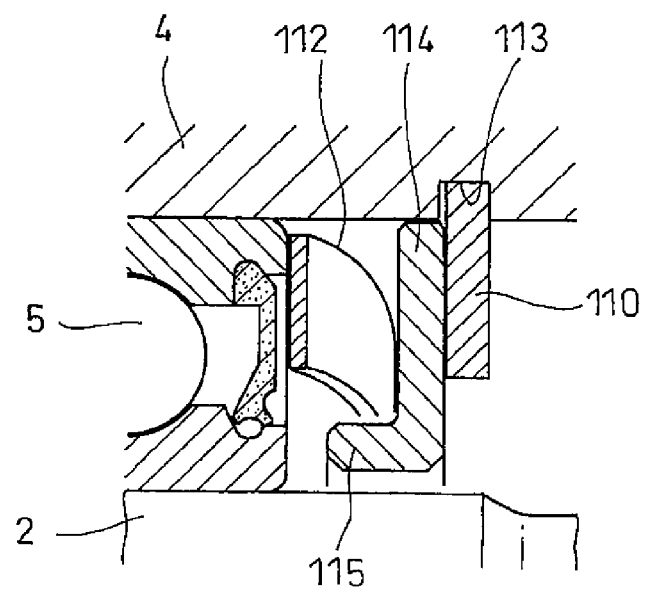
FIG. 24 is a sectional view of a guide ring which is a modification of a guide ring shown in FIG. 23.

While in FIG. 23, the backup plate 110 is integrally formed on the radially inner surface of the bearing tube 4, as shown in FIG. 24, the backup plate 110 may be in the form of a snap ring fitted in a ring groove 113 formed in the radially inner surface of the bearing tube 4.

While in FIG. 23, the guide ring 111 is provided at the radially inner portion of the backup plate 110, as shown in FIG. 24, the guide ring 115 may be provided at the radially inner portion of a guide plate 114 fitted in the radially inner surface of the bearing tube 4 and prevented from separation by the backup plate 110.

Figure 25:
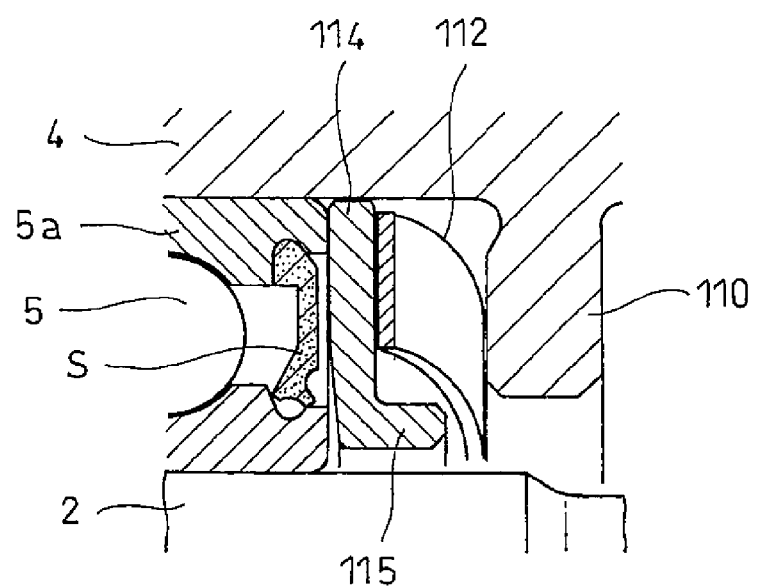
FIG. 25 is a sectional view showing the guide ring which has been mounted in position in a different manner.

In another alternative arrangement of FIG. 25, a guide plate 114 having the guide ring 115 at the radially inner portion thereof is disposed between the bearing 5 and the elastic member 112. With this arrangement, since the elastic member 112 is radially expanded by its own elastic force along the surface of the guide plate 114 when the elastic member 112 is compressed, the guide plate 114 prevents damage to a seal S mounted at an opening of the bearing 5. The guide plate 114 also prevents the radially outer surface of the elastic member 112 from getting caught on the radially inner surface of the outer race 5a when the elastic member 112 is radially expanded, thereby allowing smooth radial expansion of the elastic member 112.

What is claimed is:

1. A rotation transmission device comprising an input shaft having an end portion, an output shaft having an end portion and arranged coaxial with the input shaft, a housing covering the end portions of the input shaft and the output shaft, a two-way clutch mounted in the housing and configured to selectively transmit torque from the input shaft to the output shaft, and an electromagnetic clutch configured to selectively engage and disengage the two-way clutch, wherein the two-way clutch comprises:
an outer ring provided at the end portion of the output shaft and having an inner periphery and an opening;
an inner ring provided at the end portion of the input shaft and having an outer periphery;
a control retainer including a plurality of circumferentially spaced apart first bars;
a rotary retainer including a plurality of circumferentially spaced apart second bars, wherein the first and second bars are disposed between the inner periphery of the outer ring and the outer periphery of the inner ring, with the first bars disposed between respective circumferentially adjacent pairs of second bars, thereby defining pockets between the respective first bars and the second bars circumferentially adjacent to the respective first bars;
a plurality of opposed pairs of engaging elements, each opposed pair of the engaging elements being mounted in one of the pockets; and
elastic members mounted between the respective opposed pairs of engaging elements and biasing the opposed pairs of engaging elements toward positions where the engaging elements engage the inner periphery of the outer ring and the outer periphery of the inner ring, wherein the inner ring has a first end surface and a second end surface, the first end surface of the inner ring is located closer to the opening of the outer ring than is the second end surface of the inner ring, and the rotation transmission device further comprises an annular spring holder kept in abutment with the first end surface of the inner ring so as to rotate together with the input shaft, the spring holder including spring support pieces provided on an outer periphery of the spring holder and configured to prevent radially outward movement of the respective elastic members, wherein the electromagnetic clutch comprises an armature connected to the control retainer and movable in an axial direction of the input shaft, and an electromagnet including an electromagnetic coil supported by a yoke, wherein the electromagnetic clutch is configured to move the control retainer in the axial direction through the armature when the electromagnet is energized, thereby rotating the control retainer and the rotary retainer relative to each other in a direction in which circumferential widths of the pockets decrease, and disengaging the engaging elements, and wherein the spring support pieces are plate-shaped members disposed radially outwardly of the respective elastic members to extend in the axial direction in parallel to an outer periphery of the input shaft, wherein gaps are defined between distal ends of the spring support pieces and the outer periphery of the input shaft such that the elastic members can be inserted through the gaps.

2. The rotation transmission device of claim 1, wherein each of the spring support pieces has an inner surface, circumferential side surfaces, and tapered surfaces formed along intersections between the inner surface and the circumferential side surfaces, respectively.

3. The rotation transmission device of claim 1, wherein the spring holder is constituted by a pressed spring holder.

4. The rotation transmission device of claim 1, wherein the engaging elements comprise rollers, and wherein the two-way clutch further comprises a washer fitted on the input shaft and in abutment with the second end surface of the inner ring, thereby preventing movement of the rollers toward the second end surface of the inner ring.

5. The rotation transmission device of claim 4, wherein the washer has an outer diameter larger than a diameter of a circle passing through centers of the elastic members.

6. The rotation transmission device of claim 1, wherein the elastic members comprise coil springs having elliptical cross-sections.

7. The rotation transmission device of claim 1, wherein the engaging elements comprise rollers, wherein the two-way clutch further comprises a rotation angle restricting arrangement disposed between the input shaft and the control retainer and the rotary retainer and configured to restrict rotation of the control retainer and the rotary retainer relative to the input shaft beyond a neutral position in which the rollers are not in engagement with the inner ring and the outer ring, in directions in which the control retainer and the rotary retainer are rotated to the neutral position, respectively.

8. The rotation transmission device of claim 7, wherein each of the control retainer and the rotary retainer has a flange, and wherein the rotation angle restricting arrangement comprises a protrusion formed on the outer periphery of the input shaft, and cutouts formed in inner peripheries of the respective flanges of the control retainer and the rotary retainer, and wherein the protrusion is fitted in the respective cutouts with circumferential play left between the protrusion and each of the respective cutouts.

9. The rotation transmission device of claim 1, wherein the rotary retainer is constituted by a pressed rotary retainer.

10. The rotation transmission device of claim 9, wherein the rotary retainer further comprises an annular flange formed by pressing and having protruding pieces formed on an outer periphery of the flange of the rotary retainer, the protruding pieces being equal in number to the second bars, and wherein the second bars are formed by pressing separately from the flange of the rotary retainer, and fixedly joined to the protruding pieces.

11. The rotation transmission device of claim 1, wherein the control retainer includes a retainer body comprising an annular flange having an outer peripheral portion at which the first bars are provided, and wherein the control retainer further comprises a tubular member provided on an outer periphery of the retainer body and connected to the armature, and wherein the tubular body is formed by pressing, and is fitted in and fixedly joined to the tubular member.

12. The rotation transmission device of claim 1, wherein the electromagnet further comprises a male connector which can be detachably connected to a female connector provided at an end of a power cord, and wherein the male connector is formed with a receptacle into which the female connector can be inserted and which is located at an open end of the housing.

13. The rotation transmission device of claim 12, wherein the male connector is formed with an engaging hole in which an engaging portion provided on the female connector is configured to be snap-fitted.

14. The rotation transmission device of claim 12, wherein the electromagnetic coil is covered entirely by a coil cover, and wherein the male connector is formed by molding simultaneously when the coil cover is formed by molding.

15. The rotation transmission device of claim 1, wherein the housing has at one end thereof a bearing tube covering the output shaft and having an open end, and wherein the rotation transmission device further comprises:

a bearing mounted in the bearing tube and rotatably supporting the output shaft;

a backup plate mounted between the bearing and the open end of the bearing tube;

a second elastic member mounted between the backup plate and the bearing and biasing the housing in a first direction and the two-way clutch and the electromagnetic clutch in a second direction opposite the first direction, thereby preventing axial movements of the two-way clutch and the electromagnetic clutch relative to each other and to the housing, with the second elastic member compressed in the axial direction and with the electromagnet prevented from being pulled out of the housing; and a guide ring capable of retaining the second elastic member coaxial with the housing if the second elastic member were mounted in the bearing tube in a natural state in which the second elastic member is not compressed in the axial direction.

* * * * *